(12) United States Patent
Fliess

(10) Patent No.: US 11,385,088 B2
(45) Date of Patent: Jul. 12, 2022

(54) DOSING SYSTEM WITH ACTUATOR UNIT AND FLUIDIC UNIT WHICH CAN BE COUPLED IN A DETACHABLE MANNER

(71) Applicant: VERMES MICRODISPENSING GMBH, Otterfing (DE)

(72) Inventor: Mario Fliess, Munich (DE)

(73) Assignee: VERMES MICRODISPENSING GMBH, Otterfing (DE)

( * ) Notice: Subject to any disclaimer, the term of this patent is extended or adjusted under 35 U.S.C. 154(b) by 0 days.

(21) Appl. No.: 16/647,182

(22) PCT Filed: Sep. 11, 2018

(86) PCT No.: PCT/EP2018/074399
§ 371 (c)(1),
(2) Date: Mar. 13, 2020

(87) PCT Pub. No.: WO2019/057542
PCT Pub. Date: Mar. 28, 2019

(65) Prior Publication Data
US 2021/0018353 A1 Jan. 21, 2021

(30) Foreign Application Priority Data
Sep. 22, 2017 (DE) .................... 10 2017 122 034.8

(51) Int. Cl.
*G01F 11/44* (2006.01)
*G01F 15/18* (2006.01)
(52) U.S. Cl.
CPC ............ *G01F 11/44* (2013.01); *G01F 15/185* (2013.01)
(58) Field of Classification Search
CPC ......... G01F 11/44; G01F 15/185; B61G 5/08; F16L 37/248; F16L 37/252
See application file for complete search history.

(56) References Cited

U.S. PATENT DOCUMENTS 6,715,506 B1   4/2004  Ikushima
8,448,818 B2 * 5/2013  Ikushima .............. B05C 5/0237
                                                            222/1
(Continued)

FOREIGN PATENT DOCUMENTS

CN       2046577 U    10/1989
CN       2170429 Y     6/1994
(Continued)

OTHER PUBLICATIONS

International Search Report issued in PCT/EP2018/074399; dated Nov. 28, 2018.
(Continued)

*Primary Examiner* — Donnell A Long
(74) *Attorney, Agent, or Firm* — Studebaker & Brackett PC

(57) ABSTRACT

The present invention relates to a dosing system (100) with an actuator unit (60) and a fluidic unit (10) which can be coupled thereto in a detachable manner, wherein the fluidic unit (10) has a nozzle (20) an element (30), mounted in a movable manner, and the actuator unit (60) has an actuator system (90), in order to actuate the movable element (30) of the fluidic unit (10), wherein the fluidic unit (10) has a first plug coupling part (11) and the actuator unit (60) has a second plug coupling part (61), which can be plugged into one another for coupling the fluidic unit (10) to the actuator unit (60) along a plugging axis (S) and can be coupled to one another integrally. The invention additionally relates to a fluidic unit (10) and an actuator unit (60) for such a dosing system (100) and also a method for the detachable coupling of a fluidic unit (10) to an actuator unit (60) of a dosing system (100).

19 Claims, 10 Drawing Sheets

(56) References Cited

U.S. PATENT DOCUMENTS

Figure 1:
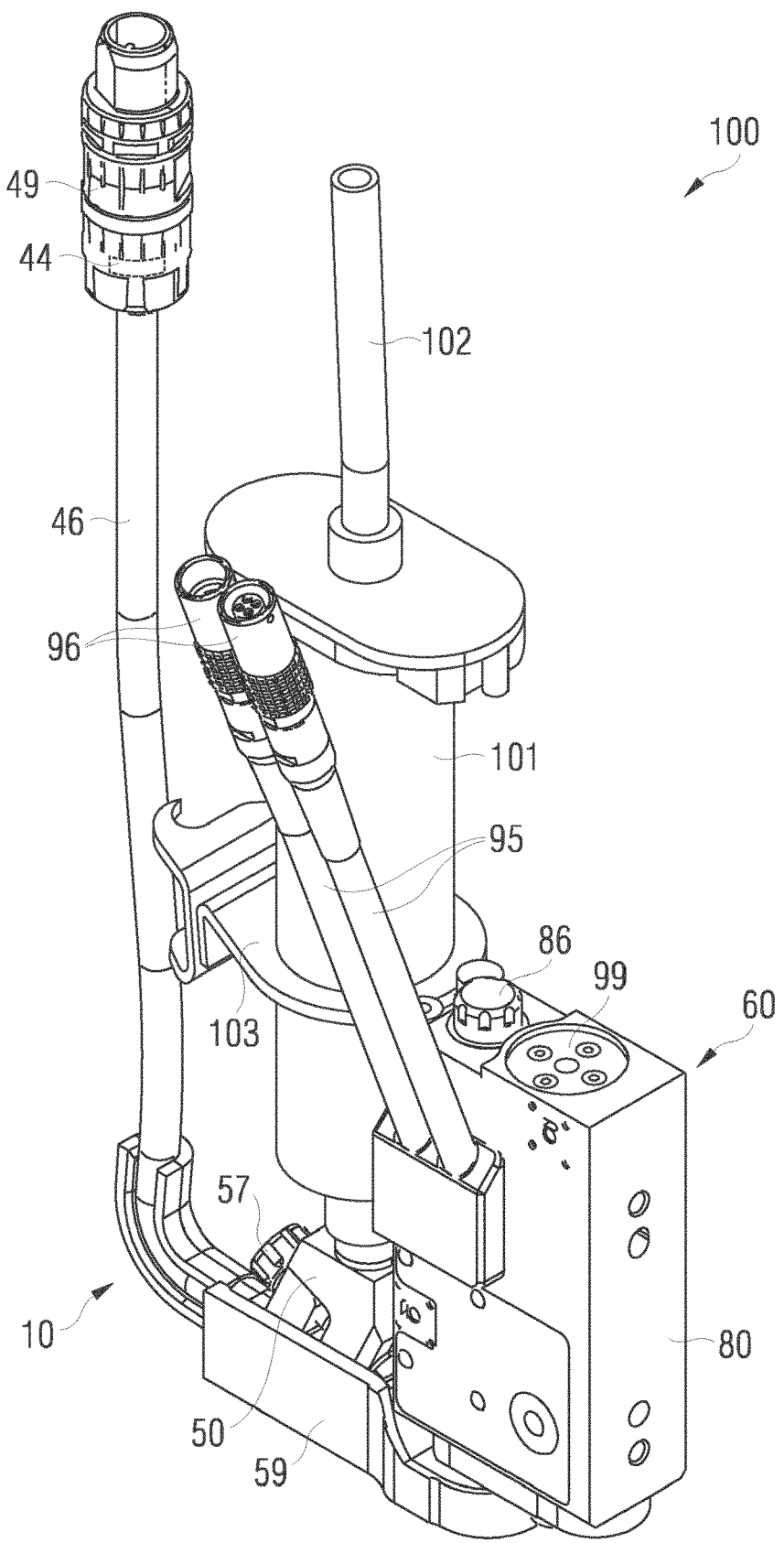

| | | | |
|---|---|---|---|
| 8,662,352 B1* | 3/2014 | des Jardins | B05C 11/1002 222/167 |
| 8,708,246 B2* | 4/2014 | Dunlap | G01F 11/029 239/1 |
| 8,753,713 B2* | 6/2014 | Clark | B05C 5/0216 427/208.2 |
| 8,939,330 B2* | 1/2015 | Ross | F16K 43/006 222/559 |
| 9,346,075 B2* | 5/2016 | Aguilar | B05C 11/1013 |
| 10,278,921 B2* | 5/2019 | Quam | B05B 7/2491 |
| 10,486,172 B2* | 11/2019 | Saidman | B05B 1/306 |
| 2002/0017238 A1 | 2/2002 | Shinozaki et al. | |
| 2003/0132243 A1* | 7/2003 | Engel | B05C 11/1002 222/61 |
| 2004/0124251 A1 | 7/2004 | Gressett et al. | |
| 2008/0006658 A1* | 1/2008 | Bolyard | F16K 27/003 222/504 |
| 2009/0101669 A1 | 4/2009 | Hassler, Jr. et al. | |
| 2013/0207388 A1* | 8/2013 | Jansson | E21B 17/046 285/363 |
| 2014/0265315 A1 | 9/2014 | Tiberghien et al. | |
| 2014/0361048 A1* | 12/2014 | Cane' | A61M 5/145 222/386 |
| 2016/0004257 A1* | 1/2016 | Fliess | F16K 51/00 137/1 |
| 2016/0279661 A1 | 9/2016 | Tanaka | |
| 2016/0339470 A1* | 11/2016 | MacIndoe | B05C 11/1034 |
| 2017/0106398 A1 | 4/2017 | Pringle, IV et al. | |
| 2017/0268709 A1* | 9/2017 | Gibson | F16L 37/252 |
| 2018/0031158 A1* | 2/2018 | Gaspar | F16L 25/009 |
| 2018/0320809 A1* | 11/2018 | Kawasaki | F16L 3/02 |
| 2019/0203864 A1* | 7/2019 | Deneke | F16L 27/1274 |
| 2019/0337009 A1 | 11/2019 | Tanaka | |

FOREIGN PATENT DOCUMENTS

| | | |
|---|---|---|
| CN | 1432435 A | 7/2003 |
| CN | 201006538 Y | 1/2008 |
| CN | 104048129 A | 9/2014 |
| CN | 104329527 A | 2/2015 |
| CN | 106166530 A | 11/2016 |
| DE | 10 2013 003 897 A1 | 9/2014 |
| DE | 10 2013 102 693 A1 | 9/2014 |
| DE | 11 2014 004 938 T5 | 7/2016 |
| EP | 1 327 482 A2 | 7/2003 |
| EP | 3 095 521 A1 | 11/2016 |
| EP | 3 096 064 A1 | 11/2016 |
| EP | 3 155 929 A1 | 4/2017 |
| KR | 2001-0099986 A | 11/2001 |

OTHER PUBLICATIONS

An Office Action; "Examination Report," mailed by the Indian Patent Office dated Mar. 4, 2022, which corresponds to Indian Patent Application No. 202027011284 and is related to U.S. Appl. No. 16/647,182.

* cited by examiner

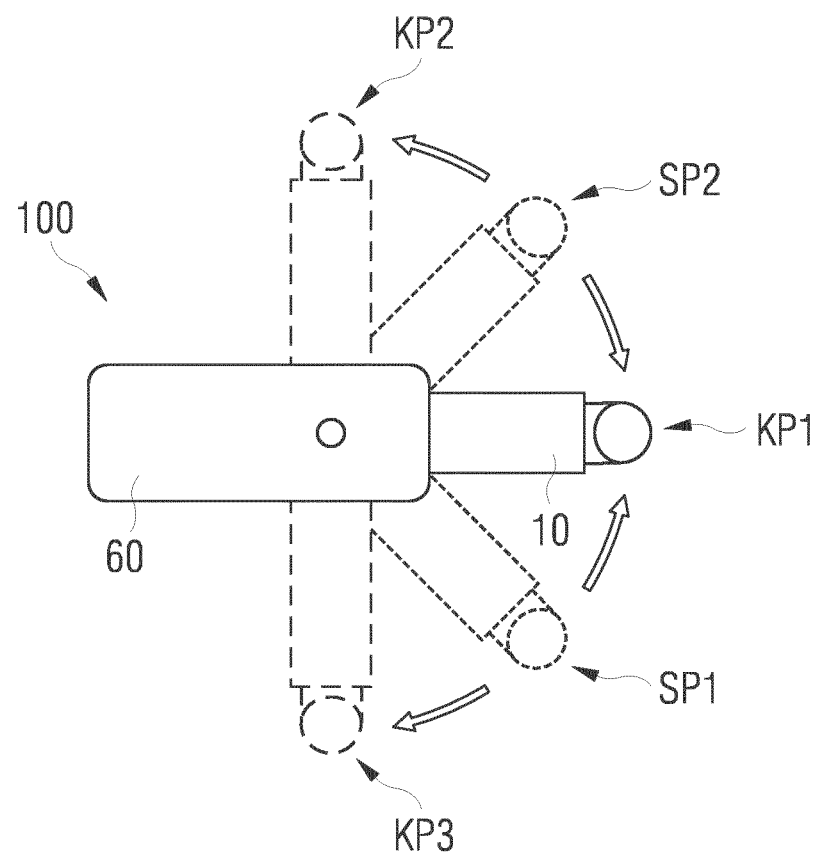

DOSING SYSTEM WITH ACTUATOR UNIT AND FLUIDIC UNIT WHICH CAN BE COUPLED IN A DETACHABLE MANNER

The invention relates to a dosing system with an actuator unit and a fluidic unit which can be coupled thereto in a detachable manner. Furthermore, the invention relates to a corresponding fluidic unit and a corresponding actuator unit for such a dosing system and a method for detachable coupling without tools of a fluidic unit to an actuator unit of a dosing system.

Dosing systems of the type mentioned at the beginning are used in order to dose a medium to be dosed, generally a liquid to viscous dosing substance, in a targeted manner in a very wide range of applications. In many applications of what is known as "micro-dosing technology", it is necessary in this case to bring very small quantities of the medium onto a target surface precisely, without the dosing system itself coming into contact with the target surface (a contactless method of this type is often also termed a "jet method"). A typical example of this is the dosing of adhesive dots, soldering pastes etc. during the assembly of printed circuit boards or other electronic elements, or the application of converter materials for LEDs. A particular challenge in this case consists in conveying the medium highly precisely, that is to say at the right time, at the right location and in a precisely dosed quantity onto the target surface.

This is achieved in that a delivery in drops takes place via a nozzle of the dosing system, wherein the size of the droplets or the quantity of the medium per droplet can be determined in advance as precisely as possible by the structure and control and the action of the nozzle achieved thereby. A preferred method here is ejection of the individual droplets in a type of "ink-jet method", as is also used inter alia in ink-jet printers (sometimes also termed an "open system"). The nozzle generally has a very small nozzle opening, in or in front of which a movable closure element or "ejection element" is arranged in the nozzle in a movable manner. This closure element or ejection element is for the most part a fine tappet or the like, which is pushed forwards in the interior of the nozzle at a relatively high speed in the direction of the nozzle opening, as a result of which a drop of the medium is ejected. This tappet is pulled back again for the renewed ejection of a drop. In most systems, the tappet can additionally be brought into a closure position, in which it securely adjoins the sealing seat of the nozzle opening in the nozzle and remains there in order to temporarily close the dosing system. In the case of more viscous dosing substances, it may be sufficient that the tappet remains in the return position, i.e. remote from the nozzle seat, without a drop of the medium escaping. In the case of yet further dosing systems, it is the case that the nozzle is opened by pulling back the closure element from the nozzle seat of the nozzle short-term and a drop of the dosing medium can escape from the nozzle as a result, e.g. owing to gravity and/or the pressure in the nozzle. Subsequently, the nozzle is closed again by means of a movement of the closure element or ejection element to the nozzle seat.

The movement of the closure element or ejection element, that is to say for example the tappet, takes place with the aid of an actuator system. An actuator system of this type may be realized in various ways, e.g. using a number of piezoelectric actuator elements, using one or more hydraulically, pneumatically and/or electromagnetically operated actuators etc. The actuator or the actuator elements of the actuator system may act directly on the closure element or ejection element (that is to say e.g. the tappet) or indirectly via a movement mechanism of the actuator system, depending on the actual construction.

In all of the previously mentioned variants, the present invention can be used independently of the actual ejection principle, i.e. in a jet method, an open ink-jet method or using a classic closure element, and independently of the principal structure of the actuator system.

The medium to be dosed itself is generally conveyed as directly as possible through a supply channel to the nozzle and there only comes into contact with the interior of the nozzle and for the most part only a front region of the closure element or ejection element, that is to say for example the tip of the tappet. If an error occurs during dosing, it is to be assumed in most cases in the known micro-dosing systems that this is not a problem of the actuator system, but rather the nozzle of the dosing system or a supply line for the medium etc. are blocked in some manner or the pot life of the medium has been exceeded. In this case, it is advantageous to be able to replace the nozzle together with the supply lines as quickly as possible without having to change the actuator system. Also, in the case of a change of the medium, this would be advantageous as nozzle and supply lines then first have to be cleaned of the medium before a different medium is used.

Thus, the dosing system according to the invention, as mentioned at the beginning, is advantageously divided into an actuator unit and a fluidic unit, which can be coupled to one another in a detachable manner. Here, the fluidic unit refers in the following to the component or the assembly which comprises the nozzle for dosing the medium and the supply line of the medium to the nozzle, i.e. all parts which are in direct contact with the medium and, in addition, the elements which are required in order to assemble the relevant parts, which are in contact with the medium, or to keep the said parts in their position on the fluidic unit (which could also be termed a fluidic assembly). In the following, an actuator unit should be understood to mean an assembly which contains the components which take care of the drive of the closure element or ejection element, that is to say the tappet for example, in the nozzle. The actuator unit (which could also be termed an actuator assembly, drive unit or the like) therefore particularly contains the actuator system with one or more actuator elements and, if appropriate, a movement mechanism, in order to be able to actuate the movable element of the fluidic unit (that is to say the closure element or ejection element). In addition, the actuator element may comprise elements in order to assemble all parts of the actuator unit or hold the said parts in their position on the actuator unit and, if appropriate, a control unit and/or an interface for an (if appropriate further) control unit, in order to be able to control the actuator system.

In many dosing systems available on the market, there is already such a separation between actuator unit and fluidic unit. However, these are relatively awkward to couple to one another, as they have to be screwed to one another or have to be mounted on one another by means of other fastening elements, which must be actuated using a suitable tool. In EP3095521A1, an electrical jet system is additionally described, in which a folding mechanism with a flap-like support is arranged on the underside of a piezoelectrically operated actuator unit, into which support a fluidic unit can be inserted. Subsequently, this support is folded upwards. The support is anchored externally on the housing in the folded-up position, so that the fluidic unit and the actuator unit are pressed together. As a result, a faster coupling of fluidic unit and actuator unit is already possible, but this is still relatively awkward, as initially the fluidic unit has to be positioned in the support of the folding mechanism, the support then has to be swung up and locked or anchored in a suitable manner. The fastening of the fluidic unit on the actuator unit can in this case only take place with exactly one relative positioning of fluidic unit and actuator unit, which additionally means that the medium supply and/or a medium reservoir, which is located at the fluidic unit, also always has to be arranged at the same position or side in relation to the actuator unit. Here, it is to be taken into account that a change of the fluidic unit on a dosing system generally does not take place when the dosing system (as e.g. in the case of initial assembly) is lying on the desk in front of the installer, but rather in very cramped spatial conditions in a larger plant complex, side-by-side with a multiplicity of further dosing systems, a tangle of supply-line hoses and cables etc. Here, the accessibility to the dosing system from various sides is not always guaranteed, so that even in the case of the dosing system with the folding mechanism, the change of the fluidic unit may be problematic under certain circumstances.

It is an object of the present invention to specify an improved dosing system with respect to the detachable coupling of the fluidic unit to the actuator unit and a fluidic unit which can be used for this and an actuator unit and a method for the detachable coupling of a fluidic unit to an actuator unit.

This object is achieved by a dosing system according to Patent Claim 1, a fluidic unit according to Patent Claim 14, an actuator unit according to Patent Claim 15 and by a method according to Patent Claim 16.

In the case of the dosing system according to the invention, the fluidic unit or fluidic assembly, as mentioned above, has a nozzle and an element (or closure and ejection element), mounted in a movable manner, e.g. a tappet. The actuator unit or actuator assembly has an actuator system in order to actuate the movable element of the fluidic unit. According to the invention, the fluidic unit has a first plug coupling part and the actuator unit has a second plug coupling part, which can be plugged into one another for coupling the fluidic unit to the actuator unit along a (virtual or imagined) plugging axis and in this case can be coupled to one another integrally. That is to say, the first plug coupling part of the fluidic unit and the second plug coupling part of the actuator unit (which could also be termed the "counterpart plug coupling part") interact in such a manner that they are not only plugged into one another, but rather, by means of a special design of these plug coupling parts with correspondingly interacting means directly in the plug coupling parts, a detachable fixing of the plug coupling parts into one another is possible. In this manner, the plug coupling parts form a quick coupling, which enables a tool-free coupling of the fluidic unit—that is to say the complete fluidic assembly, i.e. together with the constituents thereof, particularly the nozzle and the element which is mounted in a movable manner—to the actuator unit and also a correspondingly tool-free detachment of the fluidic unit from the actuator unit. Due to the option of the direct integral coupling of the plug coupling parts, further advantages, which are explained in detail further below, result depending on the actual configuration of the elements interacting for coupling the plug coupling parts. "Direct coupling" here means that no further fixing means are required apart from the interacting means directly in the plug-coupling parts, which interact or can interact with one another in a mutually plugged state of the plug coupling parts. Unlike in the case of previous dosing systems, the coupling therefore takes place without such additional fixing elements, for example in the form of additional screws or other fixing parts, which additionally have to be mounted for the coupling to the fluidic unit and/or the actuator unit with the aid of a tool and detached again, in particular removed again, by means of tools, for detaching the coupling. Preferably, the plugging axis runs parallel, particularly preferably coaxially to the ejection direction, in which the medium to be dosed is ejected or escapes from the nozzle of the fluidic unit. Also, it is not necessary to mount the various parts or elements of the fluidic unit, which are in contact with the medium, such as for example the closure or ejection element (e.g. the tappet), to the actuator unit in various works steps or unmount them from the same again, but rather the two assemblies as such are simply coupled and separated again.

In a method according to the invention for the detachable coupling of a fluidic unit to an actuator unit of a dosing system, according to the invention the plug coupling parts of the fluidic unit and the actuator unit are plugged into one another along the (virtual or imagined) plugging axis and integrally coupled to one another directly. In the case of an assembled dosing system with a fluidic unit already coupled to the actuator unit, the first plug coupling part and the second plug coupling part are plugged into one another and advantageously integrally coupled to one another, as described.

A fluidic unit according to the invention, which can also be termed "interchangeable fluidic unit" or even "quick-change fluidic unit", for such a dosing system must, according to the invention, have a first plug coupling system, which can be plugged along the (imagined) plugging axis into or over a second plug coupling part of an actuator unit of the dosing system and can be coupled integrally to the same, in order to couple the fluidic unit, as described, to the actuator unit in a detachable manner, so that the actuator system of the actuator unit or actuator assembly can actuate the element, mounted in a movable manner, of the fluidic unit. The fluidic unit may otherwise be built in any desired manner with virtually any desired components, i.e. as described above, this may be an assembly which in the usual manner comprises a nozzle for dosing the medium and the supply line for the medium and also a movable element present in the nozzle, such as the closure and/or ejection element (that is to say e.g. the tappet) and the further components, which have a direct contact to the medium or the assignment thereof to the fluidic unit makes sense, in particular those elements and components which are used to mount the movable closure or ejection element in the nozzle. The fluidic unit preferably also comprises a connection, for example a hose connection or the like, by means of which the medium is supplied into the fluidic unit, and/or a reservoir for the medium, which is coupled directly to the fluidic unit or can also be considered as an (exchangeable) part of the fluidic unit.

According to the invention, an actuator unit according to the invention has a second plug coupling part, which can be plugged along an (imagined) plug axis into or over a first plug coupling part of a fluidic unit of the dosing system and can be integrally coupled with the same, in order to couple the fluidic unit to the actuator unit in a detachable manner. Also, this actuator unit can otherwise be structured as desired and have any desired mechanism or actuator elements such as mechanical elements, pneumatic and/or electrical, in particular electromechanical elements, in particular piezoelectric actuators. The actuator unit should have a connection for controlling the actuator elements, if appropriate the actuator unit itself may also comprise a control.

Further particularly advantageous embodiments and developments of the invention result from the dependent claims and also the following description, wherein the claims of a claim category may also be developed analogously to the claims and description parts for any desired other claim category and in particular also individual features of various exemplary embodiments or variants can be combined to form novel exemplary embodiments or variants.

Particularly preferably, the fluidic unit, in particular the plug coupling part, and the actuator unit, in particular the counterpart plug coupling part thereof, are constructed in such a manner that the fluidic unit can be coupled to the actuator unit under at least two different coupling positions or rotational positions twisted about the plugging axis. That is to say, the configuration is such that various coupling positions of actuator unit and fluidic unit to one another are possible with regards to the plugging axis. Particularly preferably, these rotational positions or coupling positions differ by an angle of at least 60°, preferably approx. 90°. In a very particularly preferred embodiment, there are at least three different rotational positions from three different sides. Preferably, these rotational positions may be offset by approx. 90° to one another in each case.

In order to achieve the coupling of the plug coupling parts integrally, the first plug coupling part and the second plug coupling part may have respectively interacting projections (or elevations) and/or recesses. These projections and/or matching recesses in the first plug coupling part and in the second plug coupling part can be constructed in such a manner in this case, that the plug coupling parts can be integrally coupled in the manner of a bayonet closure, wherein the plug coupling parts are initially pushed into one another in a first rotational position with respect to the plugging axis and then the first and second plug coupling parts are twisted about the plugging axis with respect one another in such a manner that they cannot be pulled out of one another again without twisting.

In this case, as is also explained below, it is possible that both the first plug coupling part and the second plug coupling part have elevations which interact in the manner of a bayonet closure. For example, elevations like "teeth" on the first plug coupling part and on the second plug coupling part can initially be pushed past one another in a first rotational position with respect to the plugging axis and then the first plug coupling part and second plug coupling part are twisted about the plugging axis with respect to one another in such a manner that the teeth engage behind one another. It is however also likewise possible that one plug coupling part has corresponding projections and the other plug coupling part has recesses fitting the same, for example at least one first channel running in the longitudinal direction of the plugging axis on one plug coupling part and at least one fitting elevation (for example tooth) on the other plug coupling part, which runs in the channel during the plugging into one another of the plug coupling parts, and a channel section, running azimuthally around the plugging axis, adjoining the first channel, in order to anchor the elevation therein by twisting the plug coupling parts with respect to one another.

With interacting projections and/or recesses, particularly for forming a type of bayonet closure, a secure tool-free fixing, which can likewise be detached again without a tool, of the two plug coupling parts into one another is already possible without it necessarily requiring further fixings.

Alternatively or additionally, the dosing system may also have a mechanism, for example an eccentric mechanism, which is constructed in order to press the first plug coupling part and the second plug coupling part against one another in a mutually plugged position. In this case, the mechanism, particularly the eccentric mechanism, is preferably constructed in such a manner that it presses the two mutually plugged plug coupling parts against one another radially to the plugging axis.

A mechanism, particularly an eccentric mechanism, of this type has the advantage that the plug coupling parts are held in one another in a play-free manner after pressing by means of the eccentric mechanism. This allows greater tolerances during the manufacture of the plug coupling parts and thus a less expensive production.

Particularly preferably, the first and/or the second plug coupling part are produced as turned parts. This allows the production in a turning process, which can be realized with sufficiently high accuracy and in this case is less expensive than a milling process for example.

One such mechanism or eccentric mechanism may be used solely for securing the plug coupling parts in one another. However, a combination with the projections and/or recesses present on the first and second plug coupling parts, for example with the formation of a bayonet closure with additional securing by means of the mechanism or eccentric mechanism is preferred.

The mechanism or eccentric mechanism is preferably constructed in such a manner that it acts on an internal plug coupling part of the two plug coupling parts and this then presses against an inner wall of an outer plug coupling part of the two plug coupling parts.

Particularly preferably, the mechanism or eccentric mechanism acts by means of a pressure element, for example a pressure ball, on at least one of the two plug coupling parts. This pressure ball can then press out of an inner wall of the outer plug coupling part at one location and against the inner plug coupling part for clamping the two plug coupling parts against one another in the fitting position of the eccentric mechanism or eccentric lever. The inner plug coupling part may on its outer side have at least one, preferably a plurality, of recess(es) fitting the pressure element (e.g. dome-shaped) and arranged at the fitting location, into which the pressure element may press. The number of recesses may be chosen for example in accordance with the number of possible rotational positions.

A preferred alternative to an eccentric mechanism would be a mechanism, in which such a pressure element, for example also a pressure ball here, is permanently prestressed by means of a spring. This pressure ball then projects under spring loading a little at one point out of the inner wall of the outer plug coupling part and, in the case of a plugged-in inner plug coupling part, presses against the outer wall thereof. That is to say this mechanism has a corresponding pressure element and a compression spring. In this variant also, the inner plug coupling part can again, on its outer side, have at least one, preferably a plurality of fitting, e.g. dome-shaped, recess(es) for the pressure element arranged at the fitting location. Here also, the number of recesses preferably corresponds to the number of possible rotational positions.

When the inner plug coupling part is plugged into the outer plug coupling part, the pressure element is then simply pushed back, counter to the spring force, into the wall of the outer plug coupling part, until it finally latches into one of the recesses in a correct relative position of the plug coupling parts with respect to one another. Although this mechanism does not exert such a large clamping force as in the case of an eccentric mechanism, a lever actuation may be dispensed with for this. The entire mechanism is of simpler construction. Also, in this case, due to the spring force, a lateral prestress is ensured, by means of which sufficient play is drawn from the design.

Fundamentally, the second plug coupling part of the actuator unit could be plugged into a correspondingly adapted first plug coupling part of the fluidic unit. Particularly preferably, however, the fluidic unit has a male plug coupling part in the form of a connecting piece as first plug coupling part. The actuator unit then correspondingly has a female plug coupling part in the form of a mount for the connecting piece of the fluidic unit as second plug coupling part. In this preferred embodiment, the actuator unit or an actuator unit connecting piece, particularly the second plug coupling part, may have the mechanism or eccentric mechanism. This may then be constructed in order to press the connecting piece of the fluidic unit located in the mount against a wall of the mount of the actuator unit.

Most media usually to be dosed using the dosing system according to the invention have a significant temperature dependence of the viscosity. In order to keep the medium sufficiently liquid for the dosing, the dosing system preferably has an integrated heating device, which can be used for heating the medium or fluid to be dosed.

This integrated heating device may be located in the fluidic unit.

Particularly preferably, this heating device has a heating block, which surrounds at least one supply channel section for the medium and/or at least one nozzle section. One such heating block is preferably made from a very thermally conductive material, for example a metal such as copper. The supply channel section for the medium or the nozzle section are by contrast preferably themselves manufactured from a material, which is as resistant as possible with respect to the medium to be dosed, preferably from high-grade steel.

Alternatively or additionally, the actuator unit, preferably the second plug coupling part, may have a heating device. In the case of a fluidic unit coupled to the actuator unit, heat can be output from there to a supply channel section and/or a nozzle section of the fluidic unit, e.g. by means of thermal conduction. This heating device can for example comprise one or more heating lines or heating circuit board (circuit boards with suitable resistors) and if appropriate also sensors for heat measurement, which are arranged inside the plug coupling part and/or on the plug coupling part. The plug coupling parts of the fluidic unit and the actuator unit are then preferably coupled to one another in such a manner that a good thermal conduction results at least in the direction of the fluidic unit.

Particularly preferably, the supply channel section and/or at least the nozzle section are fixed in a detachable, i.e. that is to say exchangeable, manner in a material block (which could also be termed a "fluidic body"). In this case, the supply channel section and/or the nozzle section can be fixed in the material block by means of a clamping mechanism, preferably comprising a clamping screw.

If the fluidic unit should have a heating device, this material block may for example be constructed as a heating block. For example, it may be manufactured from a material, which is a particularly good conductor, and have recesses, e.g. bores or the like, in which heat conductors and/or sensors for the heating device are arranged. Preferably, this heating block is then surrounded by an insulating frame part or a covering, in order for it still to be possible to touch the fluidic unit even in the hot state of the heating block.

If the heating device is assigned to the actuator unit, in particular is located in and/or on the plug coupling part thereof, and no heating device is required in the fluidic unit, the material block may also be constructed from a heat-resistant plastic (e.g. PEEK). As a result, there is less material to be heated in the fluidic unit, which may, if appropriate, likewise lead to the set-point temperature being reached more quickly. In addition, the fluidic unit could then also be touched and unmounted in the case of a heated heating device, as the heat-resistant plastic acts in an insulating manner and can be touched.

Furthermore, it is preferred if adjacent supply channel sections and/or the nozzle section are pressed closely into one another at the ends by means of conical nipples to form a continuous supply line, in order thus to bring a continuous material supply line into the nozzle. For example, the clamping screw could, in a preferred variant, be constructed in such a manner that it can be screwed into the material block along a screwing axis running in the longitudinal direction of a part—surrounded by the material block—of a supply channel section and/or nozzle section and thus presses the supply channel sections or the nozzle section against one another at the ends respectively in the axial direction, or into one another with the aid of the conical nipples.

The heating device can be connected by means of a heating control connection to a heating control, which controls the heating device during operation, preferably regulates the same to a desired (set-point) temperature, in order to keep the medium at the desired temperature.

Very particularly preferably, the heating device, particularly the fluidic unit and/or the actuator unit, comprises a memory unit (e.g. an EEPROM or the like), in which data are stored, which are assigned to the actuator unit and/or the fluidic unit, particularly the heating device, and which are transferred to the heating control or can be read out from the same when the heating control is connected to the heating control connection, in order to connect the same to the actuator unit and/or fluidic unit or the heating device. The heating control connection can for example comprise a plug connection (preferably with a plurality of contacts) or the like. Additionally or alternatively, it may however also have an interface for (at least partially) wireless connection of the heating control to the actuator unit and/or fluidic unit, particularly the heating device, e.g. the heating current is transmitted by means of a galvanic connection and data transmission takes place wirelessly between heating control and actuator unit and/or fluidic unit or heating device.

Particularly preferably, control parameters for controlling the heating device by means of the heating control can be stored in the memory unit. Usually, a heating control namely has a controller, which requires various control parameters for the respectively connected heating device. The control characteristics are determined by these control parameters. These may in particular include the so-called PID control parameters (PID=proportional-integral-derivative component). The control parameters may in particular also be unique to a device, i.e. be different from fluidic unit to fluidic unit or be different at least for various types of fluidic units.

As the fluidic unit (if appropriate with the integrated heating device) should be exchangeable as quickly as possible—as explained above—the storage of the data for the heating control assigned to the fluidic unit or the heating device, in particular the control parameters mentioned, is of great interest for automatic transmission to the heating control. In particular, this feature may also then contribute to a faster exchange, if the coupling of fluidic unit and actuator unit takes place in a different manner than as described above, for example by means of a hitherto conventional coupling method, as then at least a reprogramming or separate data transfer to the heating control no longer has to take place, which also accelerates the change process considerably. In this respect, this data storage is also advantageous in its own right.

However, the combination with the quick plug coupling according to the invention, in which the fluidic unit and the actuator unit can be plugged into one another along a plugging axis and can be coupled to one another integrally, is particularly advantageous.

In the present case, the data, particularly the control parameters, for each heating device and/or fluidic unit can be stored in the memory unit at the factory. If appropriate, these may be determined in advance in a testing process for each individual heating device and/or fluidic unit.

Calibration data may also be stored in the memory unit as further data. These may for example be used in order to carry out a calibration of the heating device in an application on site. During the calibration, offset values for use in large throughput quantities etc. could be determined for example. Likewise, use-specific set-point temperatures or the like may be stored in the memory unit, which the heating control can use.

Further data stored in the actuator unit and/or the fluidic unit and/or the heating device may be characteristic data, for example a unique identifier of the unit, a type designation or the like. These characteristic data may also be considered as indirect control parameters, calibration data etc., if for example various control parameter records, calibration data records etc. are stored in the heating control for various characteristic data, which the heating control then accesses in each case.

As mentioned, the actuator unit has an actuator system with one or more actuators, which—if the actuator unit and the fluidic unit are properly coupled to one another—act on the closure or ejection element (e.g. the tappet) of the fluidic unit directly or indirectly (e.g. by means of a movement mechanism) depending on the actual design. For example, in this coupled position, a contact surface of an element of the actuator system, for example of a lever of the movement mechanism or the like, may press against a contact surface of the movably mounted element or closure and/or ejection element (e.g. against a contact surface on a tappet head of the tappet) of the fluidic unit, in order to move the same, particularly counter to a spring force, as is explained further below.

In this case, the structure may be such that the contact surface of the actuator unit, that is to say e.g. of the lever, (in the case of a mounted fluidic unit) is permanently in contact with the contact surface of the movably mounted element, that is to say e.g. the tappet. As is explained more precisely below, it would however also be possible that in an initial or rest position, there is a spacing between the contact surface of the actuator unit and the contact surface of the movably mounted element of the fluidic unit and the contact surfaces only press against one another upon a movement of the movably mounted element of the fluidic unit. For example, a lever of the actuator unit could, when swinging down, initially freely pass through a certain path section and only then impact against the contact surface of a tappet of the fluidic unit.

As the contact between the actuator system of the actuator unit and the element mounted in a movable manner in the fluidic unit takes place via these contact surfaces, this is also a "separation point" between actuator unit and fluidic unit, which according to the invention, as a complete fluidic assembly, can quickly be separated from the actuator unit and coupled to the same again by means of the plug coupling parts on the actuator unit and the fluidic unit or fluidic assembly.

Preferably, the dosing system is constructed in such a manner that the second plug coupling part can be adjusted along the plugging axis relatively to further components of the actuator unit or that the first plug coupling part can be adjusted along the plugging axis relatively to further components of the fluidic unit. As explained further below, the second plug coupling part is particularly preferably mounted in an adjustable manner in the actuator unit. As a result, it is possible to adjust the position of the closure or ejection element, that is to say for example the tappet, relatively to the actuator system in the actuator unit. Using such position or path adjustment, it is possible to compensate wear at the tappet tip and/or in the sealing seat of the nozzle.

Figure 2:
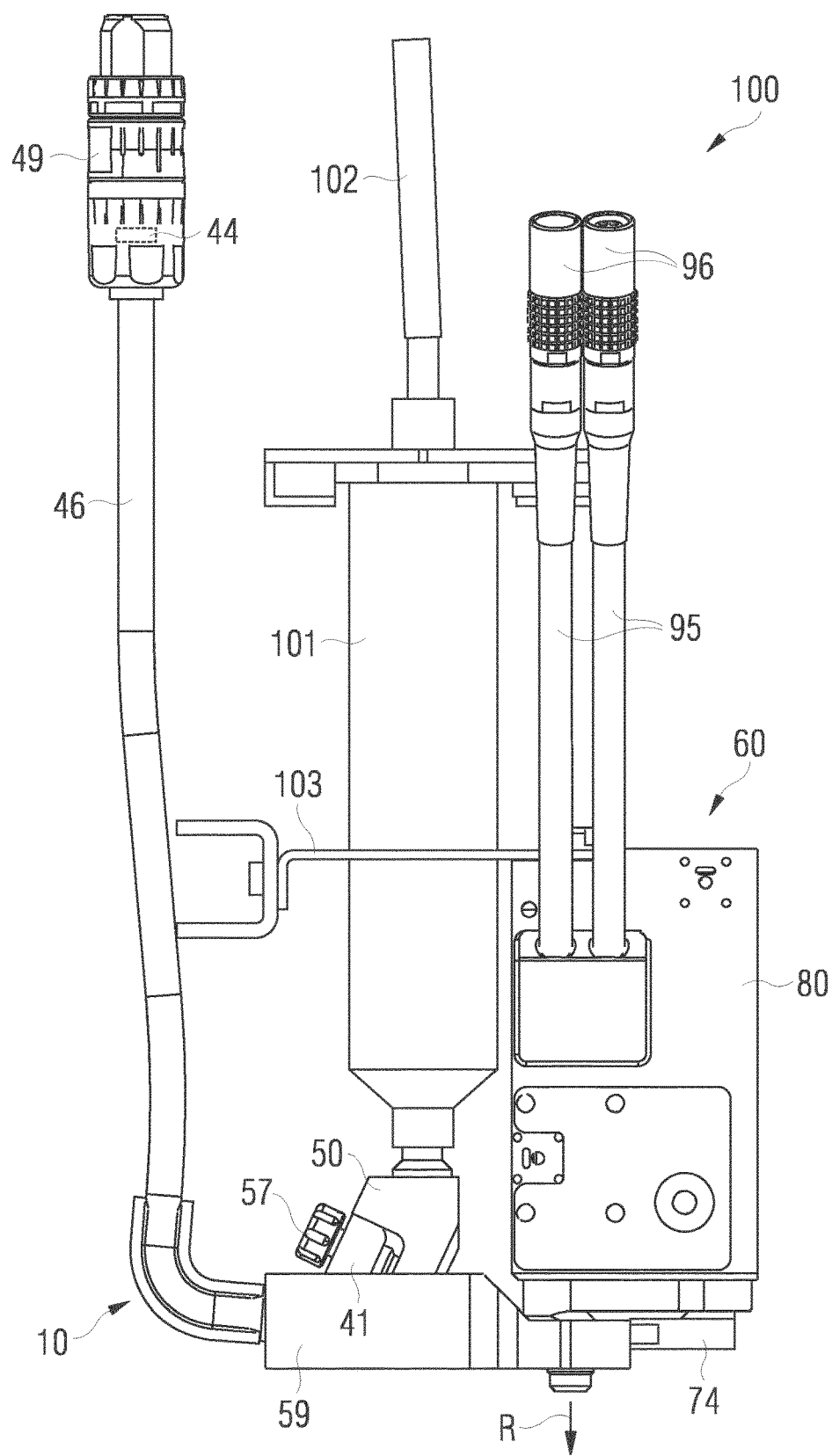
Figure 3:
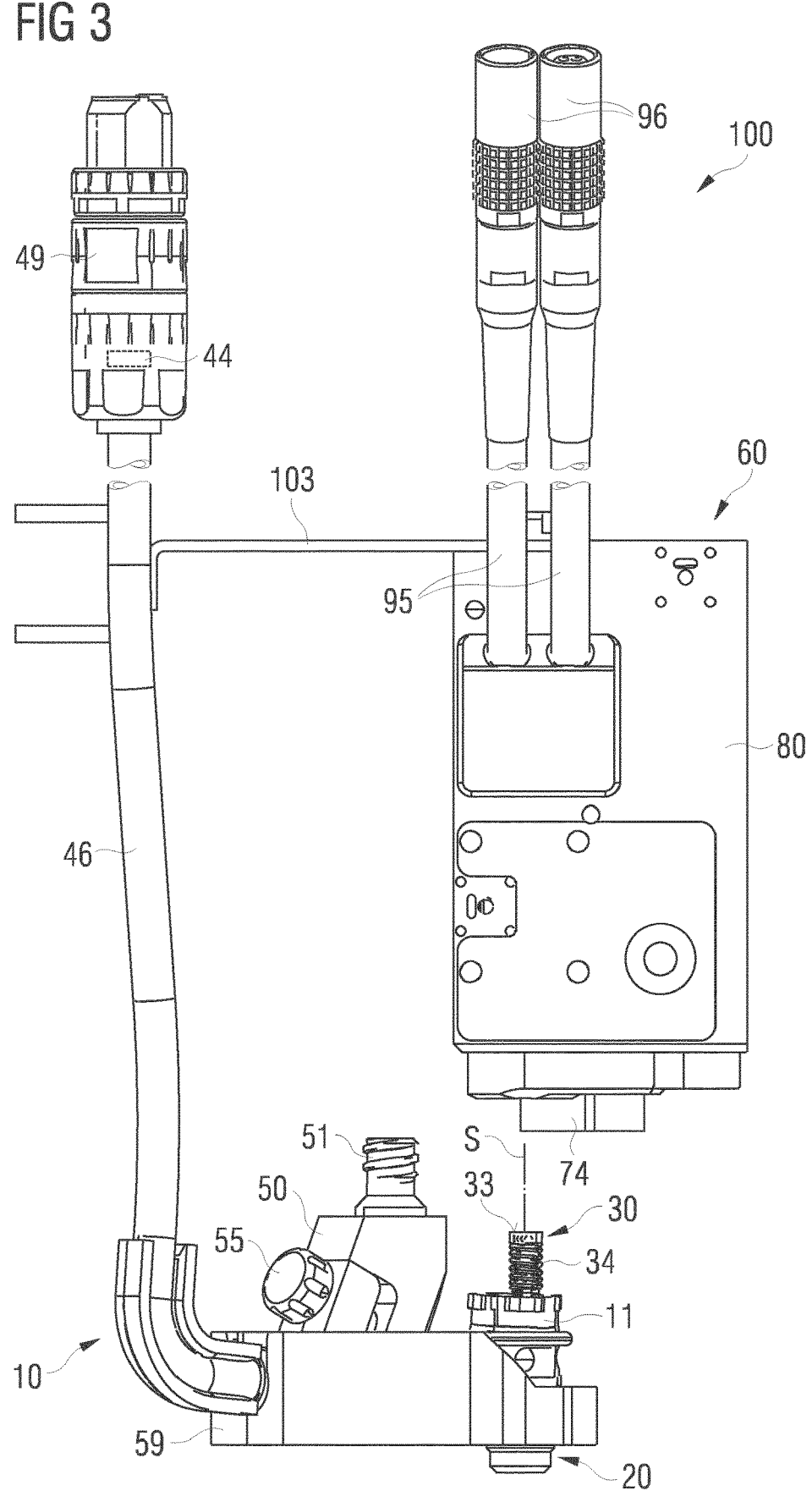
Figure 4:
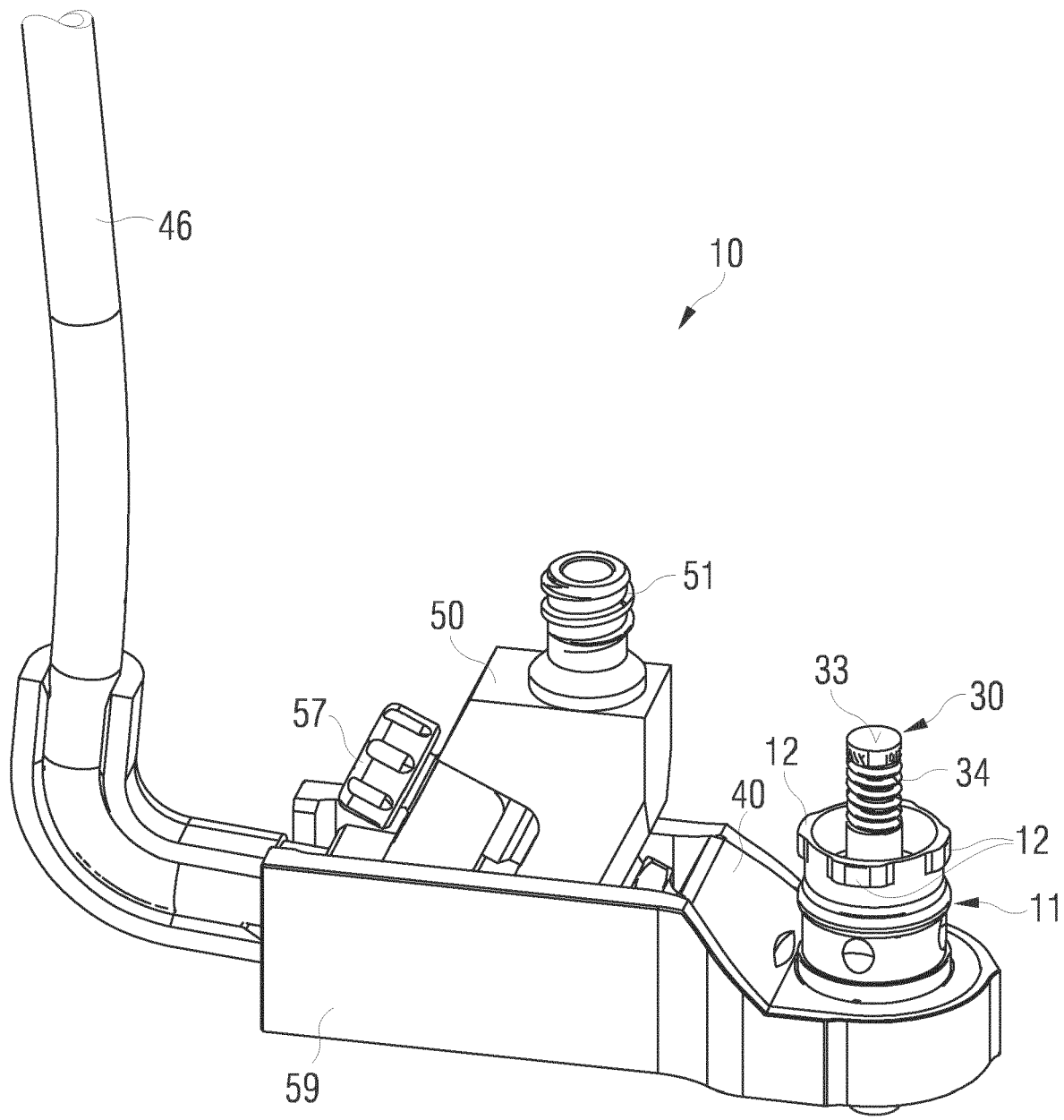
Figure 5:
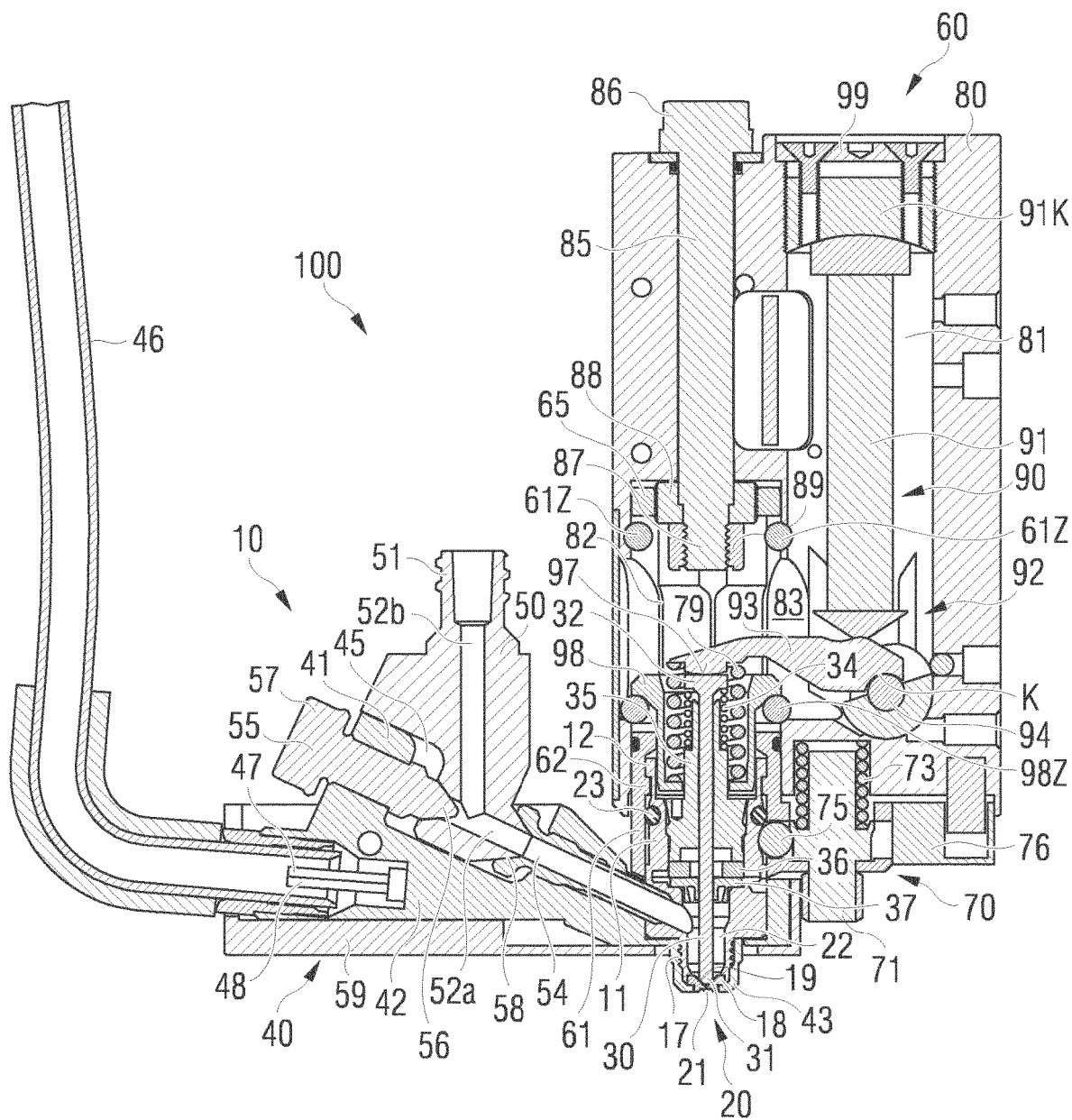
Figure 6:
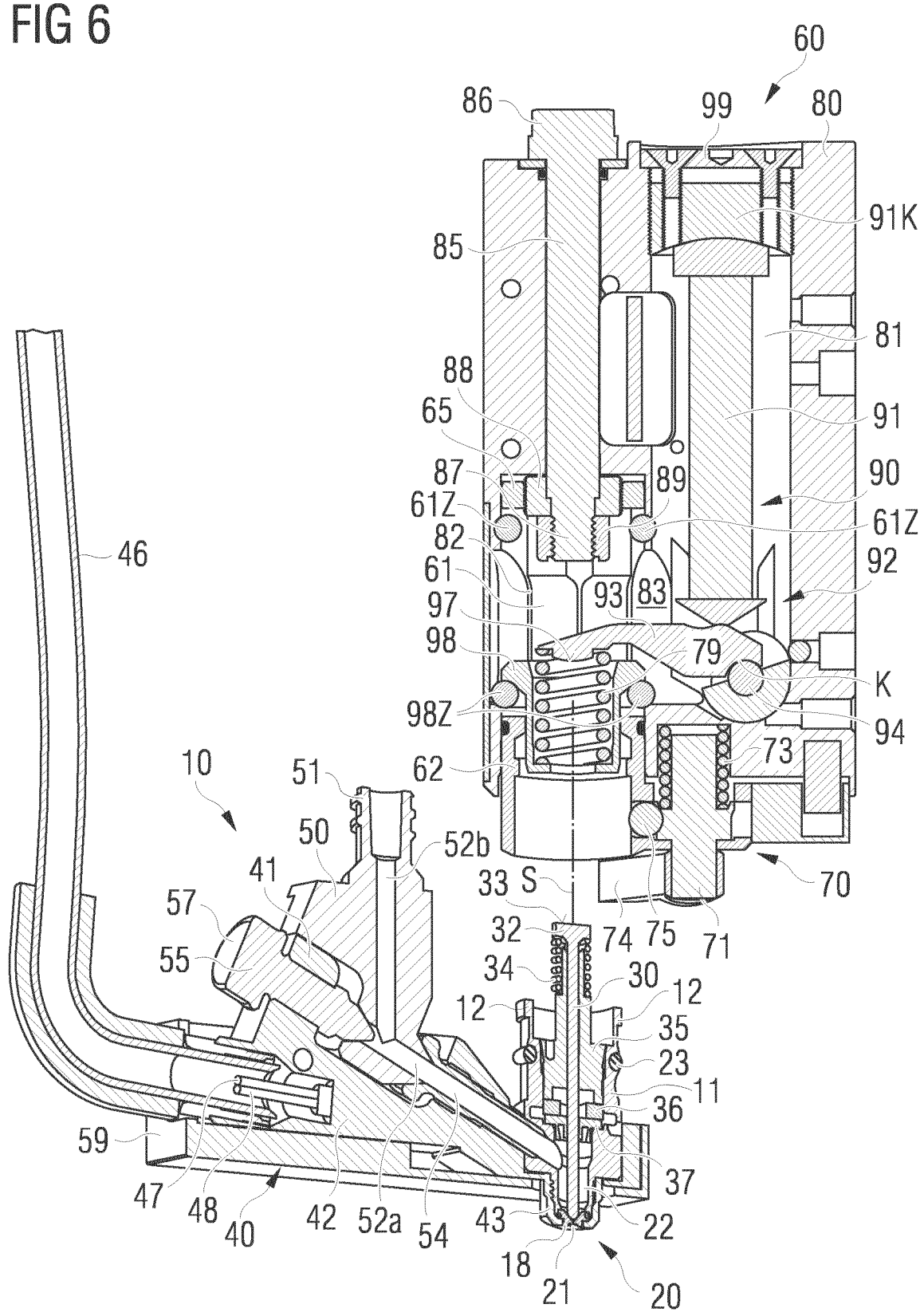
Figure 7:
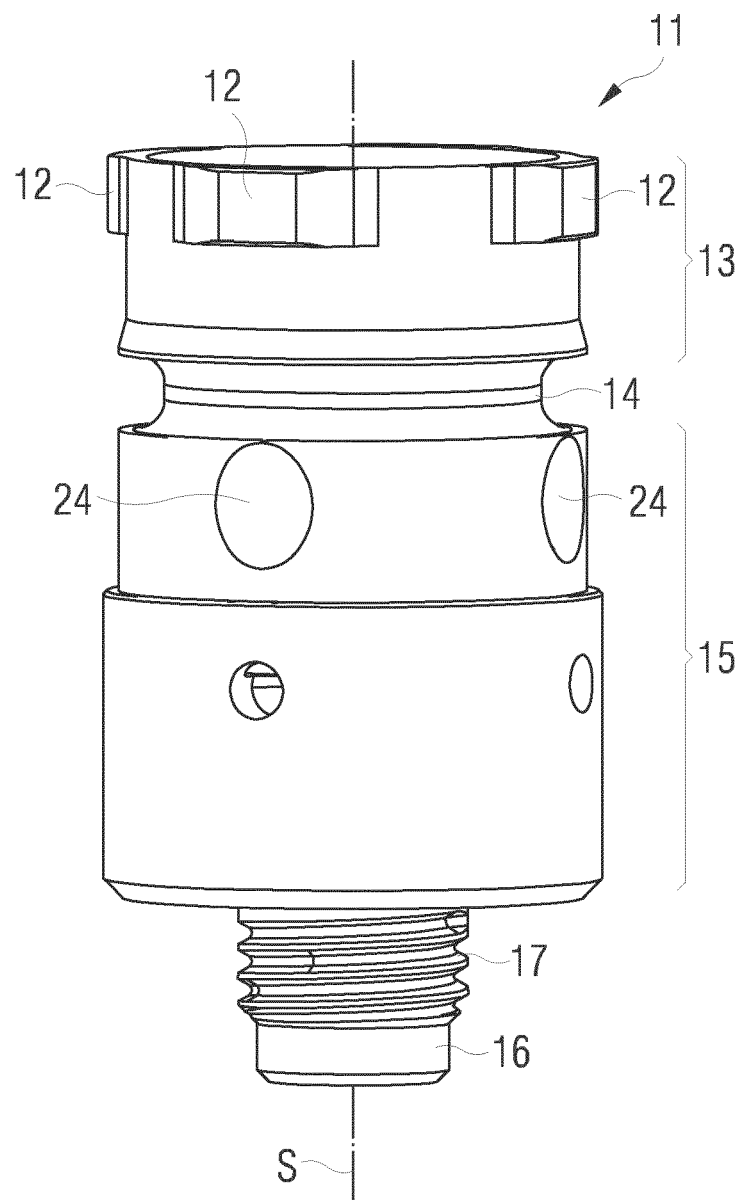
Figure 8:
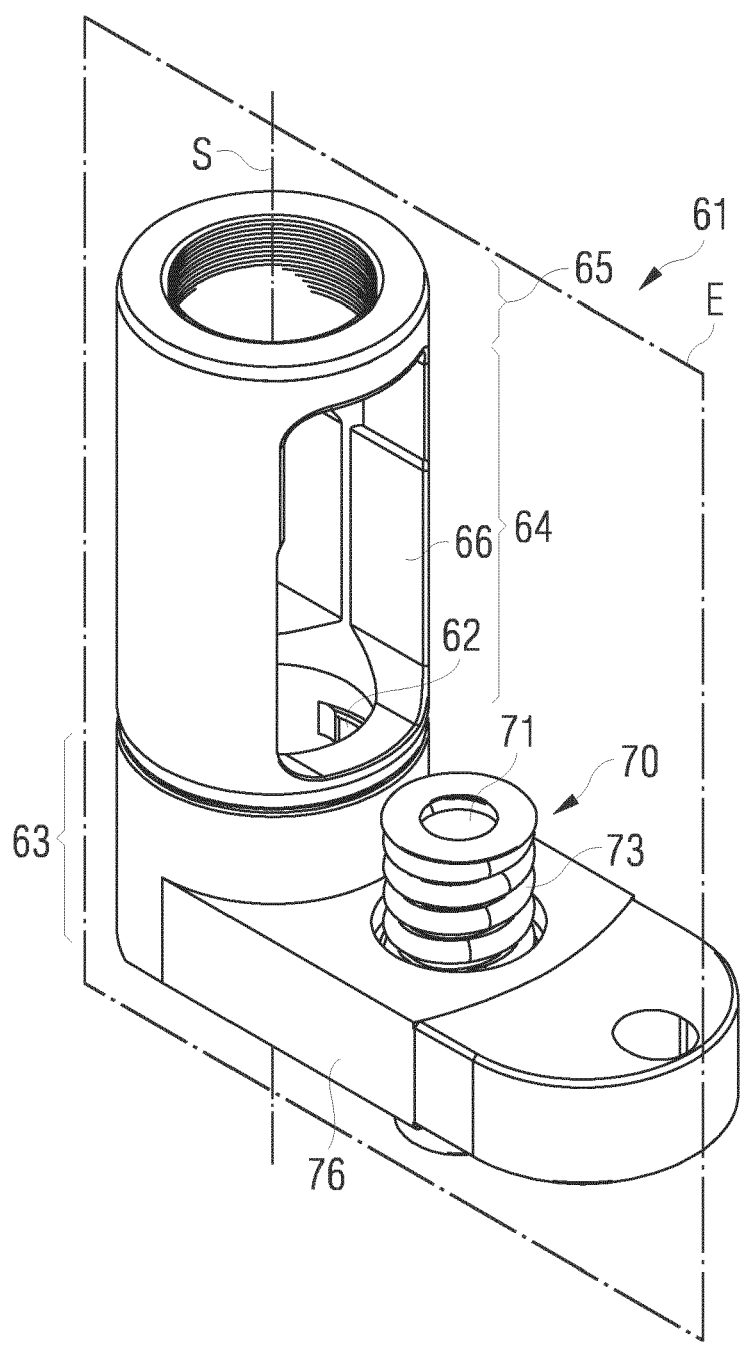
Figure 9:
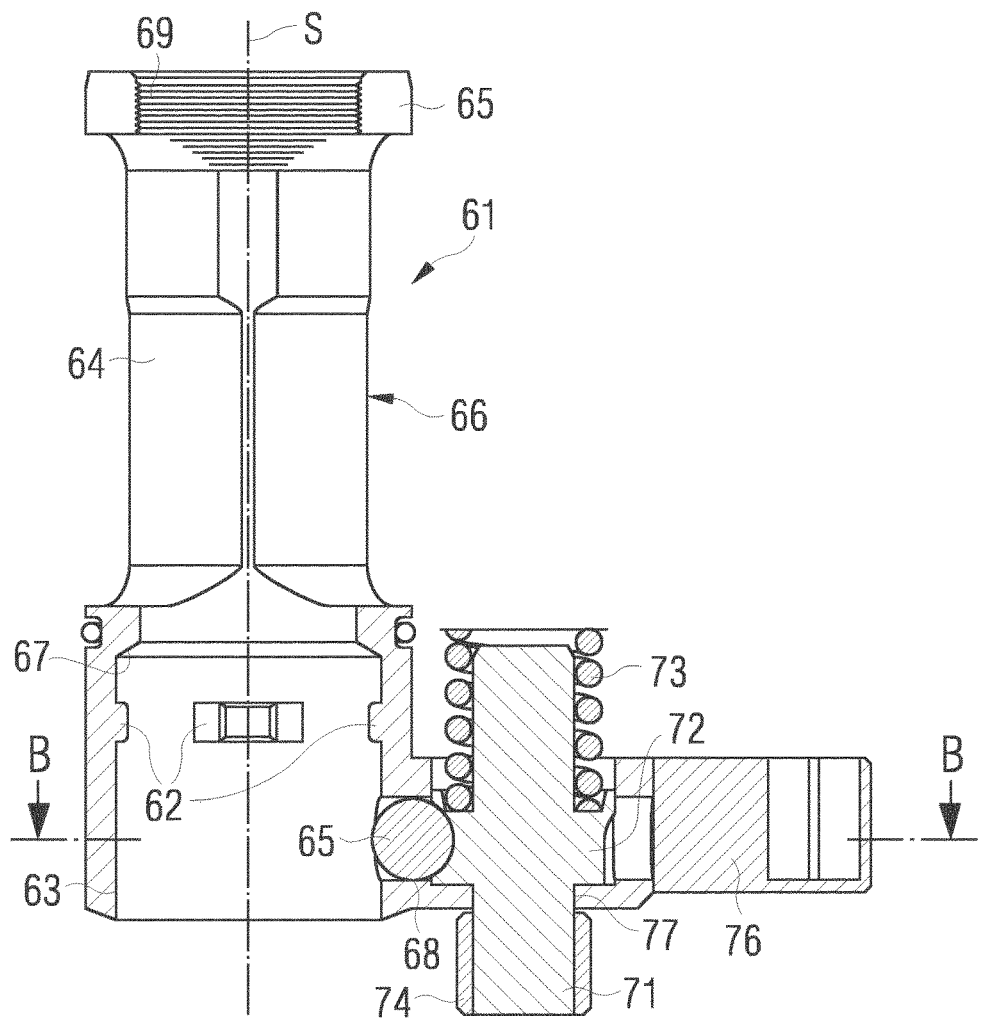
Figure 10:
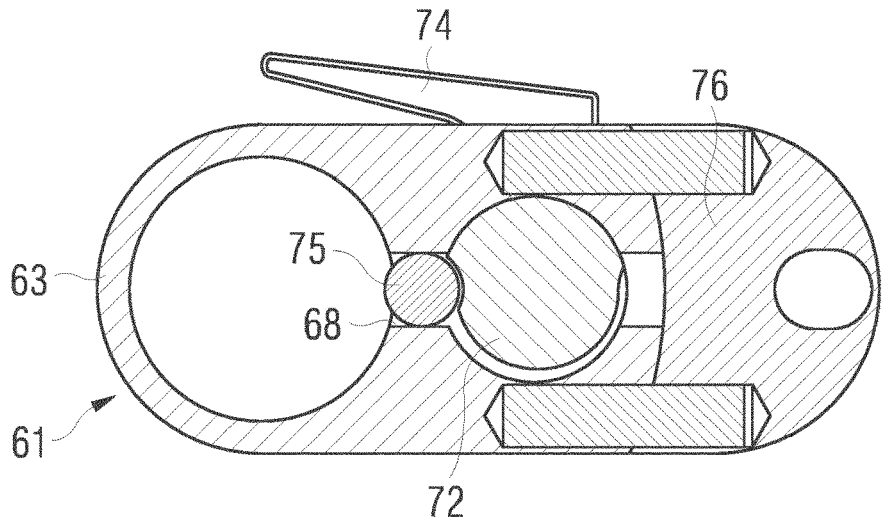

The invention is explained once more in more detail in the following with reference to the attached figures on the basis of exemplary embodiments. In this case, identical components are provided with identical reference numbers in the various figures. In the figures:

FIG. 1 shows a perspective external view from obliquely above onto an embodiment of a dosing system according to the invention, wherein the fluidic unit is coupled to the actuator unit, FIG. 2 shows a frontal view of the dosing system from FIG. 1, FIG. 3 shows a further frontal view of the dosing system from FIG. 1, wherein the fluidic unit is separated from the actuator unit however, FIG. 4 shows a perspective external view from obliquely above onto the fluidic unit of the dosing system according to FIGS. 1 to 3, FIG. 5 shows a sectional view through the fluidic unit and the lower part of the actuator unit in the coupled state as in FIG. 2, FIG. 6 shows a further sectional view through the fluidic unit and the lower part of the actuator unit in the uncoupled state as in FIG. 3, FIG. 7 shows a side view onto the plug coupling part of the fluidic unit of the dosing system according to FIGS. 1 to 6, FIG. 8 shows a perspective view from obliquely above onto the plug coupling part of the actuator unit of the dosing system according to FIGS. 1 to 6, FIG. 9 shows a sectional view through the plug coupling part along the sectional plane E from FIG. 8, FIG. 10 shows a sectional view through the plug coupling part from FIGS. 7 and 8 along a sectional line B-B from FIG. 9, FIG. 11 shows a schematic illustration of a possible coupling of fluidic unit and actuator unit of an exemplary embodiment of a dosing system according to the invention seen from above in various coupling positions.

An actual preferred exemplary embodiment of a dosing system 100 according to the invention is now explained on the basis of FIGS. 1 to 10. FIGS. 1 to 3 here show the dosing system 100 from various perspectives or in various coupling states.

The dosing system 100 has an actuator unit 60 and a fluidic unit 10 as two important basic components. In FIGS. 1 to 3 and 5 to 6, the dosing unit 100 is illustrated in the usual position in each case, wherein the fluidic unit 10 is coupled from below onto the actuator unit 60. In this position, the nozzle 20 (with a nozzle insert 18, explained further below, with a nozzle opening 21 or nozzle bore 21) of the fluidic unit 10 is located at the bottom, so that the drops of the medium are ejected downwards in an ejection direction R (cf. FIG. 2). Insofar as the terms bottom and top are used in the following, this information therefore always relates to such a, for the most part usual position of the dosing system 100. However, this does not exclude the fact that the dosing system 100 can also be used in a different position in special applications and the drops are ejected laterally for example. This is also fundamentally possible, depending on the medium, pressure and precise construction and also control of the entire ejection system.

As is also explained further on the basis of the sectional drawing in FIG. 5 and FIG. 6, the actuator unit 60 has chambers lying essentially parallel next to one another in a housing block 80, namely on the one hand an actuator chamber 81 with an actuator system 90 located therein with at least one actuator 91, and on the other hand an action chamber 82, into which, in the coupled state, a movable ejection element 30, here a tappet 30, of the fluidic unit 10 projects. By means of a movement mechanism 92, which projects from the actuator chamber 81 into the action chamber 82, the tappet 30 is actuated in such a manner by means of the actuator system 90, that the medium to be dosed is ejected in the desired quantity at the desired time by the fluidic unit 10. The tappet 30 here closes the nozzle opening 21—as explained further below—and is therefore also used as a closure element 30. As the greatest part of the medium is only ejected from the nozzle opening 21 however when the tappet 30 is moved in the closing direction, it is termed the ejection element 30 here.

To control the actuator system 90, the actuator system 90 or the actuator 91, in the present case a piezoelement stack 91 (also termed "piezostack") is to this end connected electrically or in terms of signal technology to a control (which is not illustrated here). The connection to this control takes place by means of a control cable 95, which is connected at the end to suitable actuator system control connections 96, e.g. suitable plugs. The actuator unit 60, in particular the actuator system control connections 96, can for example be provided with a suitable memory unit (e.g. an EEPROM or the like), in which information such as an item designation etc. or control parameters for the actuator unit 60 are stored, which can then be read out by the control unit in order to identify the actuator unit 60 and control the same in the fitting manner. The control cables 95 may comprise a plurality of control lines and data lines. As the basic control of piezoelements is known however, this is not covered further. If the actuator system 90, unlike that illustrated here, is not operated electrically, but rather for example pneumatically or hydraulically, a corresponding control cable 59 could also comprise suitable hoses or the like, in order to supply and drain the control medium required to this end.

As likewise explained further on the basis of FIGS. 5 and 6, the fluidic unit 10 comprises all components which come into contact with the medium to be dosed, particularly a nozzle 20 with an ejection element 30 or tappet 30 mounted therein in a movable manner. Thus, most wear parts which should be replaced first in the case of regular use of the dosing system 100 after certain product lives are also located in this fluidic unit 10. In particular, this fluidic unit 10 also comprises a reservoir connection 51, to which a supply line for the medium can be connected, or directly a reservoir 101 for the medium, for example as shown here in FIGS. 1 and 2 in the form of a medium cartridge 101. As illustrated in FIGS. 1 and 2, a reservoir pressure connection 102, by means of which sufficient pressure can be output onto the medium in order to convey the medium in the direction of the nozzle 20, is located here on the topside at the reservoir 101. The reservoir 101 or the medium cartridge 101 can fundamentally also even be considered as part of the fluidic unit 10.

The entire fluidic unit 10 has a heating device 40, as is likewise explained more precisely below, which is why the fluidic unit 10 also has a heating connection cable 46 here, which is connected at the end to a heating control connection 49 for connection to a heating control (not illustrated here). This heating connection cable 46 may comprise a plurality of lines, for example on the one hand one or more heating control lines, in order to deliver a heating current to the heating device 40 in the case of an electrically operated heating device 40, as here, and on the other hand one or more measuring lines, in order to be able to request values of temperature sensors by means of the heating control and thus set a very defined temperature in the fluidic unit 10, and also, if appropriate, one or more communication lines for the exchange of control parameters and other characteristic data on an e.g. EEPROM. Fundamentally, instead of an electrically operated heating device, a heating device may also be used however, in which a hot medium is supplied. In this case, the heating connection cable would comprise the corresponding line for the heating medium.

As can be seen well from FIGS. 1 to 3, the dosing system 100 may additionally be provided with a holder 103, which for example is fixed on the housing block 80 of the actuator unit 60 and to which the reservoir 101 can additionally be fastened for security and to which the heating connection cable 46 can be securely clamped, if this is desired, even in the case of a mounted fluidic unit 10.

As can be seen well in the perspective plan view in FIG. 4 and in particular the sectional illustrations in FIGS. 5 and 6, the fluidic unit 10 here has a frame part 59, in which the further components of the fluidic unit 10 are arranged. The frame part 59 may in this case consist of a thermally insulating material, for example a heat-resistant plastic, in order to ensure a certain touch protection.

The plug coupling part 11 ("first plug coupling part") of the fluidic unit 10 for connection to the actuator unit 60 is located on the right side in the figures in each case. To this end, an upper section with a connecting piece 13 of this plug coupling part 11 projects upwards out of the frame part 59, so that it can be plugged along a plugging axis S into a corresponding plug coupling part 61 ("second plug coupling part" 61, in the following also termed "counterpart plug coupling part" 61) of the actuator unit 60 and can be coupled to this counterpart plug coupling part 61, as is explained more precisely below.

In addition, a nozzle section 16 (cf. FIG. 7) of the plug coupling part 11 of the fluidic unit 10 extends downwards over the frame part 59 and there forms an important part of the nozzle 20.

As can be seen well in the sectional illustrations in FIGS. 5 and 6, a nozzle chamber 22, which is open at the bottom and is closed there with a nozzle insert 18 in which a fine nozzle opening 21 is located, is located in this lower nozzle section 16 of the plug coupling part 11.

This nozzle insert 18 is provided on the inner side facing the nozzle chamber 22 with a conical sealing seat 19 tapering to the nozzle opening 21, which interacts with a tappet tip 31 of the tappet 30 in the interior of the plug coupling part 11 in that the tappet tip of the tappet 30 presses against the sealing seat 19 in a closure position. This tappet is mounted in a movable manner in a longitudinal direction of the plug coupling part 11, which runs coaxially to the plugging axis S. The plugging axis S therefore also corresponds to the movement axis or longitudinal axis of the tappet 30 and the ejection direction R of the drops. As the plug coupling part 11 can advantageously be produced as an additional turned part and only has to be post processed slightly using other technologies, (for example in order to apply the toothing which is also explained below), for example by milling, this plugging axis S is simultaneously also the rotational axis of the plug coupling part 11.

To fix the nozzle insert 18 with the nozzle opening 21 on or in the lower front opening of the plug coupling part 11, the plug coupling part 11 has a thread 17 on its lower nozzle section 16 (cf. FIG. 7), by means of which a nozzle lateral surface section 43 can be screwed on in the manner of a cap nut (cf. FIGS. 5 and 6). This nozzle lateral surface section 43 may here be constructed from a material, which is a particularly good thermal conductor, preferably the same material as the heating block 42, which is also explained below, of the heating device 40 of the fluidic unit 10, and to the greatest extent possible may be constructed such that it has contact with the remaining parts of the heating block 42 in a good thermally conductive manner.

As is further to be seen in FIGS. 5 and 6, a tappet seal 37 is inserted from above, i.e. starting from the front opening facing in the direction of the actuator unit 60 in the mounted state, into the plug coupling part 11 for mounting the tappet 30, with a central bore, which is adapted to the diameter of the tappet 30. A sealing supporting ring 36 is placed thereabove and subsequently a tappet bearing part 35 is screwed in from above, which likewise has a fitting through-hole for the tappet 30. The tappet 30, at its upper end opposite the tappet tip 31, has a widened tappet head 32, the free end face thereof having a contact surface 33 for a lever 93, which is also explained below, of the movement mechanism 92 of the actuator system 90. A spring 34 is here pushed onto an upwardly extending guide section of the tappet bearing 35, which spring presses the tappet head 32 upwards away from the tappet bearing part 35 in the axial direction and thus also presses the tappet tip 31 away from the sealing seat 19. That is to say without external pressure from above onto the contact surface 33 of the tappet head 32, the tappet tip 31 is located spaced from the sealing seat 19 of the nozzle insert 18 in the rest position of the spring 34.

As can be seen in particular in FIG. 7, the plug coupling part 11 of the fluidic unit 10 has a plurality of part sections 13, 14, 15 on the section, which projects upwards over the frame part 59 and can be plugged into the counterpart plug coupling part 61 of the actuator unit 60. A clamping section 15 first adjoins the frame part 59 at the bottom, on which, in a mounted state of the fluidic unit 10 in the actuator unit 60, an additional clamping acts by means of an eccentric mechanism 70, explained further below, of the actuator unit 60 or the counterpart plug coupling part 61. To this end, the clamping section 15 has a plurality of spherical calottes 24. A circumferential annular groove 14 for a seal 23, for example a typical O-ring 23 is located thereabove. This seal 23 ensures that the plug coupling part 11 of the fluidic unit 10 and the counterpart plug coupling part 61 of the actuator unit 60 are sealed with respect to one another in an annular manner in the assembled state. Above this annular groove 14, a bayonet coupling section 13 or toothing section 13 or connecting piece 13 is located, on which a plurality of radially outwardly extending projections 12 or teeth 12 are arranged at the end in each case. As is also explained below, teeth 62 fitting the same in the interior of the counterpart plug coupling part 61 may start to interact, so that the plug coupling parts 11, 61 can be integrally coupled according to the invention.

In FIGS. 5 and 6 it can further be seen well that the plug coupling part 11 of the fluidic unit 10 has a lateral bore running radially obliquely upwardly outwards from the nozzle chamber 22 in a central region located in the frame part 59 of the fluidic unit 10 in the assembled state. This bore is used for supplying the medium to be dosed into the nozzle chamber 22.

A supply channel section 54 adjoins this bore of the plug coupling part 11 on the outside, at the free end of which the reservoir interface 50 is connected in turn. A channel with fitting channel sections 52a, 52b is located in the same, which channel runs from the supply channel section 54, which leads to the nozzle 20, up to the reservoir connection 51. As the reservoir connection 51 is directed upwards here, so that the reservoir 101 can be arranged parallel to a longitudinal direction of the housing block 80 of the actuator unit 60 and the medium to some extent also runs from the reservoir 101 in the direction of the nozzle 20 due to gravity, the channel sections 52a, 52b are arranged in the reservoir interface 50 at an angle to one another, namely a first channel section 52a, which runs in the extension of the supply channel section 54, and a second channel section 52b, which runs from the first channel section 52a essentially vertically upwards to the reservoir connection 51. The reservoir connection 51 has a thread externally, in order to be able to screw on an opening of the reservoir 101 equipped with a mating internal thread or a supply connection (not illustrated). The sealed fixing of the supply channel section 54 on the plug coupling part 11 and the reservoir interface 50 on the supply channel section 54 takes place here by means of clamping with the aid of a clamping screw 55 which is also explained below.

The plug coupling part 11 of the fluidic unit 10 with the nozzle chamber 22 located therein and also the supply channel section 54 and the reservoir interface 50 are preferably manufactured from a material, which is highly resistant to the widest range of media to be dosed, from high-grade steel here for example. The same is true for the tappet seal 37, for the tappet 30 itself and also for the nozzle insert 18. The sealing supporting ring 36 consists of a suitable resistant material. Thus, all components which come into contact with the medium are manufactured from a moderately resistant material.

In order to keep the medium at a desired temperature during the dosing, the fluidic unit 10 has a heating device 40, as mentioned. This comprises a relatively solid heating block 42 as an important element, which is shaped in such a manner that it surrounds the region of the plug coupling part 11 containing the nozzle chamber 22, the supply channel section 54 and a part of the reservoir interface 50 like a type of jacket. This heating block 42 is made from a material which conducts heat particularly well, for example copper or at least one copper-containing metal. On the one hand at least one heating wire (not illustrated) and on the other hand at least one temperature sensor (not illustrated) are located in the heating block 52. The heating wire is connected to a heating control line 47 in the heating connection cable 46, which may for example form an extension of the heating wire, in order to conduct current of a desired intensity through the heating wire and thus to heat the heating block 42. The temperature sensor is connected to a temperature measuring line 48 in the heating connection cable 46, in order to detect the current temperature of the heating block 42 and thus the medium. The heating control line 47 and the temperature measuring line 48 are guided via the heating connection cable 46 to the already above-mentioned heating control connection 49 (also termed heating plug 49), to which the heating control can be connected. In the heating control connection 49, a memory unit 44, for example an EEPROM 44, is preferably located here, in which various data about the fluidic unit 10 and in particular the heating device 40 (also termed heating module 40) are contained and can be read out for the heating control, for example an identifier of the fluidic unit 10 and/or the heating device 40, an item designation etc., in order to identify the fluidic unit 10 and/or the heating module 40 and e.g. enable a check of which heating module 40 is connected to which heating circuit. Furthermore, preferred control parameters, for example PID control parameters, for a control unit in the heating control are stored therein. When connecting the heating control to the heating control connection 49, the data may be read out from the memory unit 44 automatically by the heating control and are available for control.

The heating block 42 is also simultaneously shaped in the same manner here that it can be used for fixing the reservoir interface 50 on the supply channel section 54 in one another and also for fixing the supply channel section 54 on the plug coupling part 11 of the fluidic unit 10. To this end, an approximately square recess 45 is located in an upper region of the heating block 42, into which the supply channel section 54 can initially be inserted and pushed in through a bore in the heating block 42 which leads to the lateral, obliquely radial opening in the plug coupling part 11 to the nozzle chamber. This opening in the plug coupling part 11 tapers in a conical manner from the inside out, so that the supply channel section 54 with a correspondingly shaped conical tip can be plugged in there. At its rear end facing the reservoir interface 50, this supply channel section 54 has a likewise inwardly conically tapering opening for accommodating a conical nipple 58 at the end of the channel section 52a in the reservoir interface 50 running in the same axial direction as the supply channel section 54. The reservoir interface 50 is to this end likewise inserted into the recess 45 of the heating block 42 and then pushed into the supply channel section 52 from behind using the conical nipple 58. In the continuing axial direction of the supply channel section 54 and the channel section 52a of the reservoir interface 50 running coaxially thereto, the already mentioned clamping screw 55 can then be screwed into a clamping screw section 41 of the heating block 42 at the rear end of the channel section 52a remote from the plug coupling part 11. The screwing direction of this clamping screw 55 likewise runs coaxially to the longitudinal direction of the supply channel section 54 or the corresponding channel section 52a in the reservoir interface 50. This channel section 52a of the reservoir interface 50 running coaxially to the supply channel section 54 is a continuous channel in this case, which is open again in the direction of the clamping screw 55 and likewise has a conical inwardly obliquely tapering section, into which a tip more 56 of the clamping screw 55 may press. If the clamping screw 55 is screwed into the clamping screw section 41, then the tip 56 is automatically pressed into the end of the channel section 52a of the reservoir interface 50 facing the clamping screw 55 and the front-side end (the conical nipple 58) of this channel section 52b is in turn pressed into the end section of the supply channel section 54 facing the reservoir interface 50, as a result of which the tip of the supply channel section 54 is simultaneously pressed into the correspondingly conically tapering opening in the plug coupling part 11. Thus, the entire supply line is automatically sealed during the clamping of conical nipples formed at the ends of the channel sections against one another in each case. In order to apply the pressure necessary for this, the clamping screw 55 has a screw head 57, which is equipped on the outside with a knurl or with engagement options for a tool, e.g. a hexagonal head and/or hexagonal socket.

To couple the fluidic unit 10 to the actuator unit 60, the actuator unit 60, as said, has the counterpart plug coupling part 61, which can likewise be seen well in the sectional drawings in FIGS. 5 and 6 and which is additionally also illustrated perspectively and in various sections in FIGS. 8 to 10.

This counterpart plug coupling part 61 has a bayonet coupling section 63 or mounting section 63 (also termed mount 63 for brevity) at its end facing the plug coupling part 11 of the fluidic unit 10, into which the bayonet coupling section 13 or toothing section 13 of the plug coupling part 11 of the fluidic unit 11 can be plugged up to an annular collar 67 (or shoulder, which is used as a stop) protruding inwards from the inner wall of the plug coupling part 11. In a space below this collar 67 or shoulder 67, corresponding projections 62 or teeth 62 are located on the inner wall of this mount 63 of the counterpart plug coupling part 61, which can start to interact with the teeth 12, which extend radially outwards on the bayonet coupling section 13 of the plug coupling part 11 of the fluidic unit 10. The construction and arrangement of the teeth 12, 62 is to this end chosen in such a manner that in at least a first angular position or rotational position (with respect to a rotation about the plugging axis S) of the plug coupling part 11 and the counterpart plug coupling part 61 with respect to one another, the teeth 12, 62 run past one another if the plug coupling parts 11, 61 are plugged into one another. This rotational position could be termed a plug position SP1, SP2 (which is explained below on the basis of FIG. 11). Then, the two plug coupling parts 11, 61 can be twisted about the plugging axis S with respect to one another, so that the teeth 12 of the plug coupling part 11 of the fluidic unit 10 engage behind the inwardly extending teeth 62 in the counterpart plug coupling part 61 and prevent it from being possible to pull the plug coupling part 11 back out of the counterpart plug coupling part 61.

A further section of the counterpart plug coupling part 61, which is here termed the engagement section 64, extends upwards in the direction of the plugging axis S. This has recesses 66 on two radially opposite sides, of which one, as is explained below, is used such that a lever 93 of the movement mechanism 92 of the actuator system 90 can enter into contact with the tappet 30 of the mounted fluidic unit 10 or can actuate the same.

At its upper end, the counterpart plug coupling part 61 then has a fixing section 65, which is used to fix the complete counterpart plug coupling part 61 inside the housing block 80 of the actuator unit 60. To this end, reference is made in particular to FIG. 6. This fixing takes place by means of a set screw 85 running in the direction of the plugging axis S from above through the housing block 80, which set screw has a screw head 86 at its upper end, which protrudes upwards out of the housing block 80 and which projects by way of a lower plug coupling connection section 87 into the action chamber 82.

As already mentioned, the housing block 80 has various chambers lying next to one another, namely on the one hand, an action chamber 82 open at the bottom towards the fluidic unit 10, in which the counterpart plug coupling part 61 is pushed and fixed there, and on the other hand, an actuator chamber 81, lying essentially parallel next to the same, which is open at the top but can be closed there, in which actuator chamber the actuator system 90 essentially is arranged with its actuator 91, here the piezostack 91, and a movement mechanism 92 with a lever 93, which is explained below. Via an opening 83, the lever 93 can protrude from the actuator chamber 81 into the action chamber 82 and there start to interact with the tappet 30 of a fluidic unit 10 connected in the actuator unit 60 (cf. FIG. 5).

To this end, the set screw 85 is pushed in from above through a corresponding bore in the housing block 80 and a threaded part 88 is pushed on the plug coupling connection section 87 protruding into the action chamber 82, which threaded part is fixed on the set screw 85 at the end in a rotationally fixed manner using a nut 89, which is screwed onto a thread on the plug coupling connection section 87. That is to say that this threaded part 88 is in engagement with the set screw 85 in such a manner that when the set screw 85 is twisted, for example from the outside by means of the screw head 86, the threaded part 88 is entrained in rotation. This threaded part 88 has an external thread, which engages into an internal thread 69 in the fixing section 65 of the counterpart plug coupling part 61. As a result, the position of the counterpart plug coupling part 61 inside the housing block 80 of the actuator unit 60 can be adjusted precisely with the aid of the set screw 85. Thus, an adjustment of the "height setting" of the tappet 30 (which should always be located in a precisely defined position inside the counterpart plug coupling part 61 due to the bayonet-closure-like toothing of the plug coupling parts 11, 61) mounted in the fluidic unit 10 can take place relatively to the housing block 80 and thus also relatively to the movement mechanism 92 of the actuator system 90 or to a contact point 97 on the lever 93. That is to say, it is possible to precisely set how far the tappet 30 is pressed in a defined initial position of the actuator system 90 by means of the movement mechanism 92, namely the lever 93, counter to the spring 34 in the direction of the sealing seat 19 of the nozzle 20. Due to two cylinder pins 61Z in the housing block 80 of the actuator unit 60, a stop for the height adjustment of the counterpart plug coupling part 61 is reached.

A piezostack 91, which expands and can contract again in the longitudinal direction of the actuator chamber 81 in accordance with wiring by means of a control device, is located in the actuator chamber 81 here, as mentioned. This piezostack 91 can be inserted from above into the actuator chamber 81. A spherical calotte 91K, the height of which can be adjusted by means of a screwing movement, is then used as upper thrust bearing. This is screwed into a thread of the actuator chamber 81 and thus enables the precise adjustment of the actuator system 90 and here the piezostack 91 for the lever 93 in particular. In this case, the thread is designed and dimensioned in such a manner that the necessary prestress forces and peak forces due to operation can be absorbed and a very precise position adjustment is ensured during mounting at the same time. For the vibration-resistant securing of the spherical calotte 91K, this is screwed to a cover 99 by means of four countersunk screws and thus secured against twisting due to operation. This spherical calotte 91K presses from above against an upper thrust piece of the piezostack 91 adapted to the spherical calotte 91K. Due to the position of the spherical calotte 91K relative to the cover 99, the position of the upper bearing of the piezostack 91 can be defined precisely or a prestress can be applied to the piezostack 91. At the bottom, the piezostack 91 is mounted on a lever 93 by means of a thrust piece, which tapers acutely at the bottom and which in turn bears against a lever bearing 94 in the lower end of the actuator chamber 81. The lever 93 can be tilted by means of this lever bearing 94 about a tilt axis K, so that a lever arm of the lever 93 protrudes through the opening 83 into the action chamber 82 and there projects through the recess 66 into the engagement section 64 of the counterpart plug coupling part 61. At the end of the lever arm, the same has a contact surface 97, facing in the direction of the tappet 30 of a fluidic unit 10 coupled in the actuator unit 60, which contact surface presses onto the contact surface 33 of the tappet head 32.

It is mentioned at this point that in the exemplary embodiment illustrated, it is provided that this contact surface 97 of the lever 93 (with mounted fluidic unit 10) is permanently in contact with the contact surface 33 of the tappet head 32, in which the spring 34 presses the tappet head 32 against the lever 93 from below. Fundamentally, it would however also be possible that in an initial or rest position of the spring 34, a spacing is present between tappet 30 and lever 93, so that the lever 93 initially passes freely through a certain path section when swinging down and picks up speed in the process and then impacts with high momentum against the tappet 30 or the contact surface 33 thereof, in order to increase the ejection momentum, which the tappet 30 in turn exerts onto the medium.

In order to enable a virtually constant prestress of the lever piezo drive system of the actuator system 90, independently of the respectively required setting via the fixing section 65, the lever 93, at the end at which it comes into contact with the tappet 30, is pressed upwards by means of an actuator spring 79, which is mounted in its own guide cylinder 98. Due to this mounting, a user-side change of the position of the fluidic unit 10 in the coupled state by means of the set screw 85 does not lead to a change in length of the actuator spring 79 and thus to a strongly changed prestress force of the piezoelectric drive. The guide cylinder 98 is fixed in its position in the housing block 80 of the actuator unit 60 by means of two cylinder pins 98Z, so that it offers a stationary bearing for the actuator spring 79. This guide cylinder 98 has a through hole on its lower front side, approximately at the height of the teeth 62 of the counterpart plug coupling part 61, which through hole is adapted to the diameter of a corresponding section of the tappet bearing 35, which is screwed from above in the plug coupling part 11 of the fluidic unit 10. In the case of mutually coupled fluidic unit 10 and actuator unit 60, the toothing section 13 or bayonet coupling section 13 of the plug coupling part 11 of the fluidic unit 10 is therefore located in an annular gap arranged coaxially to the plugging axis S between the toothing section 63 or bayonet coupling section 63 of the counterpart plug coupling part 61 and an external wall of this guide cylinder 98.

For the additional manual securing of the fluidic unit 10 on the actuator unit 60 and in particular, so that the plug coupling part 11 and counterpart plug coupling part 61 are coupled into one another in a manner free from play in the mounted state, the counterpart plug coupling part 61 here has an already mentioned eccentric mechanism 70.

To this end, on one side of the plug coupling part 61, an eccentric holder 76 extends radially outwards away from the bayonet coupling section 63. This may be formed in one piece with the counterpart plug coupling part 61. If, however, the counterpart plug coupling part 61 is produced as a turned part, this eccentric holder 76 is advantageously flanged laterally onto the outer wall of the counterpart plug coupling part 61, for example using corresponding screws, coupling pins or the like. In the exemplary embodiment illustrated, this eccentric holder 76 extends radially outwards along an underside of the housing block 80 of the actuator unit 60, which has corresponding bores and recesses in a lower region, so that this eccentric holder 76 and the further parts of the eccentric mechanism 70 can be accommodated there.

A through hole 77 is located in this eccentric holder 76 running parallel to the plugging axis S, into which through hole an eccentric shaft 71 is inserted, which projects both downwards and upwards over the eccentric holder 76. In an upper section, a spring 73 is located on the eccentric shaft 71, by means of which spring the eccentric shaft 71 (with the counterpart plug coupling part 61 inserted in the housing block 80 of the actuator unit 60) is pressed away from the housing block 80 and is pressed with a lower shoulder of an eccentric section 72 of the eccentric shaft 71 against a fitting collar of the through hole 77 in the eccentric holder 76. By means of this spring 73, it is also ensured that the counterpart plug coupling part 61 is pressed downwards in the thread of the threaded part 88 of the set screw 85 and thus is positioned free from play in the actuator unit 60. A further section 78 extends from this eccentric section 72 downwards from the eccentric holder 76, which section is coupled to an eccentric lever 74, which can be operated by an operator, in order to twist the eccentric shaft 71 about its longitudinal axis, at the height of the eccentric section 72, which, as can be seen well in FIG. 10, is formed eccentrically in a plane running perpendicularly to the longitudinal axis of the eccentric shaft 71. A pressure ball 75 is here inserted into a through hole 68 or the like between the bore 77 for the eccentric shaft 71 and the inner region of the bayonet coupling section 63 of the counterpart plug coupling part 61, on which pressure ball this eccentric section 72 acts. If a plug coupling part 11 of a fluidic unit 10 has then been pushed from below into the counterpart plug coupling part 61 and it is in the desired coupling position, in which the teeth of the bayonet-like coupling mechanism are meshed with one another, the operator can twist the eccentric shaft 71 about its own axis by simply tilting the eccentric lever 74 and thus also twist the eccentric section 72 in such a manner that the pressure ball 75 is pressed outwards out of the through hole 68 at relatively high pressure against the outer wall of the plug coupling part 11, namely in the region of the clamping section 15 into one of the spherical calottes 24 (cf. FIG. 7). Thus, the entire plug coupling part 11 is always pressed against the inner wall of the counterpart plug coupling part 61 opposite the pressure ball 75, as a result of which, after tightening the eccentric lever 74, an exactly defined position of plug coupling part 61 of the fluidic unit 10 with respect to the counterpart plug coupling part 61 of the actuator unit 60 is ensured. In this case, the through hole 68 is preferably constructed in such a manner that the pressure ball 75 cannot completely reach the interior of the mounting section 63 of the counterpart plug coupling part 61.

In another mechanism (not illustrated), which can for example be used alternatively to the eccentric mechanism, the pressure ball 75 is pressed by means of a compression spring, instead of by the eccentric section 72, a little out of the through hole 98 into the interior of the mounting section 63 of the counterpart plug coupling part 61. This mechanism works then as a latching mechanism. When the plug coupling part 11 is plugged into the counterpart plug coupling part 61, the pressure ball 75 is pressed back, counter to the spring force, into the through hole 98, until it latches into one of the spherical calottes 24 in the outer wall of the plug coupling part 11.

As becomes clear from the previously described exemplary embodiment, the invention offers the great invention that a coupling of a fluidic unit 10 to an actuator unit 60 of a dosing system 100 according to the invention is possible from various sides.

This is explained once more on the basis of FIG. 11, which illustrates an actuator unit 60 and a fluidic unit 10 roughly schematically from above in various positions in relation to one another twisted about the plugging axis S. For example, plugging in the plug coupling part 11 of the fluidic unit 10 into the counterpart plug coupling part 61 of the actuator unit 60 could optionally take place along the plugging axis S in at least two different plug positions SP1, SP2. By means of a simple pivoting of the fluidic unit 10 to the actuator unit 60, by 45 degrees for example about the plugging axis S, the fluidic unit 10 can then be brought to the actuator unit 60 into a coupling position KP1, KP2, KP3, in which the toothings are latched behind one another and the plug coupling part 11 of the fluidic unit 10 can no longer be pulled out of the counterpart plug coupling part 61 of the actuator unit 60. In FIG. 11, three possible coupling positions KP1, KP2, KP3 are shown in this case, in which the fluidic unit 10 is located at three different rotational positions offset by 90 degrees to one another in each case. By means of the eccentric mechanism 70 or a different mechanism, for example the described latching mechanism, additional security may then be achieved if desired.

Thus, the invention allows a particularly convenient and quick coupling of fluidic unit 10 and actuator unit 60 even under very cramped conditions inside a dosing plant. Finally, it is once more pointed out that the components of the dosing system described previously in detail are merely exemplary embodiments, which can be modified in wide ranging ways by the person skilled in the art and the features of which can be recombined, without departing from the scope of the invention. For example, it would also be possible to only couple the fluidic unit to the actuator unit with the aid of the toothing or to achieve a fixing only with the aid of the eccentric mechanism. Likewise, the actuator unit could, as already mentioned previously, have a heating device additionally or alternatively to the heating device of the fluidic unit. This could be located in and/or on the plug coupling part thereof, for example. It is then possible to dispense with the heating device of the fluidic unit and a material block made from heat-resistant plastic (e.g. PEEK) may be used instead of the heating block. Besides, this material block can however perform the same functions mechanically as the above-described heating block 42, i.e. it may in particular be used for pressing the supply channel sections 53, 54 and/or the nozzle section 16 into one another in the manner described, in order to form a continuous sealed supply line for the dosing substance. Furthermore, the invention can also be used in other dosing methods, i.e. not only in microdosing technology, even if it is of particular value in this field owing to the specific problems arising there. Furthermore, the use of the indefinite article "a" or "an" does not exclude the idea that the relevant features may also be present multiple times. In addition, "units" may consist of one or more components which may even be arranged in a spatially distributed manner.

REFERENCE LIST

10 Fluidic unit
11 (First) plug coupling part
12 Projection/tooth
13 Bayonet coupling section/toothing section/connecting piece
14 Annular groove 15 Clamping section
16 Nozzle section
17 Thread
18 Nozzle insert
19 Sealing seat
20 Nozzle
21 Nozzle opening/nozzle bore
22 Nozzle chamber
23 Seal/O-ring
24 Spherical calotte
30 Movable element/ejection element/tappet
31 Tappet tip
32 Tappet head
33 Contact surface
34 Spring
35 Tappet bearing part
36 Sealing supporting ring
37 Tappet seal
40 Heating device/heating module
41 Clamping screw section
42 Heating block
43 Nozzle lateral surface section
44 Memory unit/EEPROM
45 Recess
46 Heating connection cable
47 Heating control line
48 Temperature measuring line
49 Heating control connection/heating plug
50 Reservoir interface
51 Reservoir connection
52a, 52b Channel sections
54 Supply channel section
55 Clamping screw
56 Tip
57 Screw head
58 Conical nipple
59 Frame part
60 Actuator unit
61 (Second) plug coupling part/counterpart plug coupling part
61Z Cylinder pin
62 Projection/tooth
63 Bayonet coupling section/mounting section/mount
64 Engagement section
65 Fixing section
66 Recesses
67 Collar/shoulder
68 Through hole
69 Internal thread
70 Eccentric mechanism
71 Eccentric shaft
72 Eccentric section
73 Spring
74 Eccentric lever
75 Pressure ball
76 Eccentric holder
77 Through hole
78 Section
79 Actuator spring
80 Housing block
81 Actuator chamber
82 Action chamber
83 Opening
85 Set screw
86 Screw head
87 Plug coupling connection section
88 Threaded part
89 Nut
90 Actuator system
91 Actuator/piezoelement stack/piezostack
91K Piezo encapsulation
92 Movement mechanism
93 Lever
94 Lever bearing
95 Control cable
96 Actuator system control connections
97 Contact surface
98 Guide cylinder
98Z Cylinder pins
99 Cover
100 Dosing system
101 Reservoir/medium cartridge
102 Reservoir pressure connection
103 Holder
K Tilt axis
KP1, KP2, KP3 Coupling position
E Ejection direction
S Plugging axis
SP1, SP2 Plug position

The invention claimed is:

1. A dosing system with an actuator unit and a fluidic unit which can be coupled thereto in a detachable manner,
wherein the fluidic unit has a nozzle and an element, mounted in a movable manner, and the actuator unit has an actuator system, in order to actuate the movable element of the fluidic unit,
wherein the fluidic unit has a first plug coupling part and the actuator unit has a second plug coupling part, the first plug coupling part and the second plug coupling part being configured to be directly coupled together to thereby couple the fluidic unit to the actuator unit along a plugging axis (S), the first plug coupling part and the second plug coupling part being coupled to one another integrally,
wherein the first plug coupling part includes a plurality of projections that are configured to engage with a plurality of projections of the second plug coupling part such that, in a state where the first plug coupling part is coupled to the second plug coupling part, the first plug coupling part is prevented from being pulled out of the second plug coupling part,
wherein movement of the movable element occurs in a first direction to start dispensing a fluid, and
wherein movement of the movable element occurs in a second direction to stop dispensing the fluid.

2. The dosing system according to claim 1, wherein the actuator unit and the fluidic unit are constructed in such a manner that the fluidic unit can be coupled to the actuator unit under at least two different rotational positions around the plugging axis.

3. The dosing system according to claim 1, having a mechanism which is constructed in order to press the first plug coupling part and the second plug coupling part against one another in a mutually plugged position.

4. The dosing system according to claim 3, wherein the mechanism acts on an internal plug coupling part of the two plug coupling parts and presses the same against an inner wall of an outer plug coupling part of the two plug coupling parts.

5. The dosing system according to claim 3, wherein the mechanism acts on at least one of the two plug coupling parts by means of a pressure element.

6. The dosing system according to claim 3, wherein the mechanism is an eccentric mechanism which is constructed in order to press the first plug coupling part and the second plug coupling part against one another radially to the plugging axis.

7. The dosing system according to claim 6, wherein the eccentric mechanism acts on at least one of the two plug coupling parts by means of a pressure element.

8. The dosing system according to claim 1, wherein the fluidic unit has a connecting piece as first plug coupling part and the actuator unit has a mount for the connecting piece of the fluidic unit as second plug coupling part.

9. The dosing system according to claim 1,
wherein the fluidic unit
and/or
the actuator unit has a heating device.

10. The dosing system according to claim 9,
wherein the heating device is a heating block surrounding a supply channel section and/or at least one nozzle section,
and/or
wherein the second plug coupling part has a heating device which outputs heat to the supply channel section and/or nozzle section of the fluidic unit in the case of the fluidic unit being coupled to the actuator unit.

11. The dosing system according to claim 10, wherein the supply channel section and/or at least the nozzle section are fixed in the heating block in a detachable manner.

12. The dosing system according to claim 11,
wherein the supply channel section and/or the nozzle section are fixed in the heating block by means of a clamping screw,
and/or
wherein adjacent supply channel sections and/or the nozzle section are pressed into one another at the ends by means of conical nipples to form a continuous supply line.

13. A dosing system with an actuator unit and a fluidic unit which can be coupled thereto in a detachable manner, particularly according to claim 1, wherein the actuator unit and/or the fluidic unit comprise a heating device and a heating control connection for connection to a heating control and a memory unit, in which data for the heating control assigned to the actuator unit and/or the fluidic unit, particularly the heating device, are stored.

14. The dosing system of claim 13, wherein the data includes control parameters for controlling the heating device by means of the heating control.

15. The dosing system according to claim 1,
wherein the second plug coupling part can be adjusted along the plugging axis relatively to further components of the actuator unit
and/or
wherein the first plug coupling part can be adjusted along the plugging axis relatively to further components of the fluidic unit.

16. The dosing system according to claim 1, wherein the first and/or the second plug coupling part are produced as turned parts.

17. A fluidic unit for a dosing system according to claim 1, wherein the fluidic unit has a nozzle, an element mounted in a movable manner and a first plug coupling part, which can be plugged along a plugging axis into or over a second plug coupling part of an actuator unit of the dosing system and can be coupled to the same, in order to couple the fluidic unit to the actuator unit, which has an actuator system, in a detachable manner, in order to actuate the movable element of the fluidic unit.

18. An actuator unit for a dosing system according to claim 1, wherein the actuator unit has a second plug coupling part, which can be plugged along a plugging axis into or over a first plug coupling part of a fluidic unit of the dosing system and can be coupled to the same, in order to couple the fluidic unit, which has a nozzle and an element mounted in a movable manner, to the actuator unit in a detachable manner, so that an actuator system of the actuator unit can actuate the element, mounted in a movable manner, of the fluidic unit.

19. A method for the detachable coupling of a fluidic unit to an actuator unit of a dosing system,
wherein plug coupling parts of the fluidic unit and the actuator unit are configured to be directly coupled together to thereby couple the fluidic unit to the actuator unit along a plugging axis, the plug coupling parts of the fluidic unit and the actuator unit being coupled to one another integrally,
wherein the plug coupling part of the fluidic unit includes a plurality of projections that are configured to engage with a plurality of projections of the plug coupling part of the actuator unit such that, in a state where the plug coupling parts are coupled together, the plug coupling part of the fluidic unit is prevented from being pulled out of the plug coupling part of the actuator unit,
wherein the fluidic unit includes an element that is mounted in a movable manner,
wherein movement of the movable element occurs in a first direction to start dispensing a fluid, and
wherein movement of the movable element occurs in a second direction to stop dispensing the fluid.

* * * * *